(12) United States Patent
Okabe

(10) Patent No.: US 11,405,527 B2
(45) Date of Patent: Aug. 2, 2022

(54) IMAGE PROCESSING APPARATUS AND CONTROL METHOD TO RESTRICT A FUNCTION THAT IS MADE AVAILABLE BY AN AUTHORITY

(71) Applicant: CANON KABUSHIKI KAISHA, Tokyo (JP)

(72) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/223,371

(22) Filed: Apr. 6, 2021

(65) Prior Publication Data
US 2021/0385356 A1 Dec. 9, 2021

(30) Foreign Application Priority Data
Jun. 5, 2020 (JP) .............................. JP2020-098733

(51) Int. Cl.
*H04N 1/44* (2006.01)
*G06F 3/12* (2006.01)
*H04N 1/00* (2006.01)

(52) U.S. Cl.
CPC ......... *H04N 1/4433* (2013.01); *G06F 3/1222* (2013.01); *G06F 3/1238* (2013.01); *G06F 3/1239* (2013.01); *H04N 1/00482* (2013.01); *H04N 1/00511* (2013.01)

(58) Field of Classification Search
None
See application file for complete search history.

(56) References Cited

U.S. PATENT DOCUMENTS

2005/0275868 A1* 12/2005 Higashiura ............ G06K 15/00
358/1.14
2015/0186078 A1* 7/2015 Ozawa .................. G06F 3/1288
358/1.13

FOREIGN PATENT DOCUMENTS

JP 2019117539 A 7/2019

\* cited by examiner

*Primary Examiner* — Thomas D Lee
(74) *Attorney, Agent, or Firm* — Canon U.S.A., Inc. IP Division

(57) ABSTRACT

An image processing apparatus includes a providing unit configured to provide, to a second user given an authority of tenant administrator from a first user having an authority of shared office administrator, a function of designating an allowable number of print sheets with respect to a tenant to which the second user belongs or a third user who belongs to the tenant to which the second user belongs, wherein, in a case where the third user, when authenticated, uses a print processing function, the third user is allowed to use the print processing function up to an allowable number of print sheets designated by the second user, who is a tenant administrator of the tenant to which the third user belongs.

10 Claims, 31 Drawing Sheets

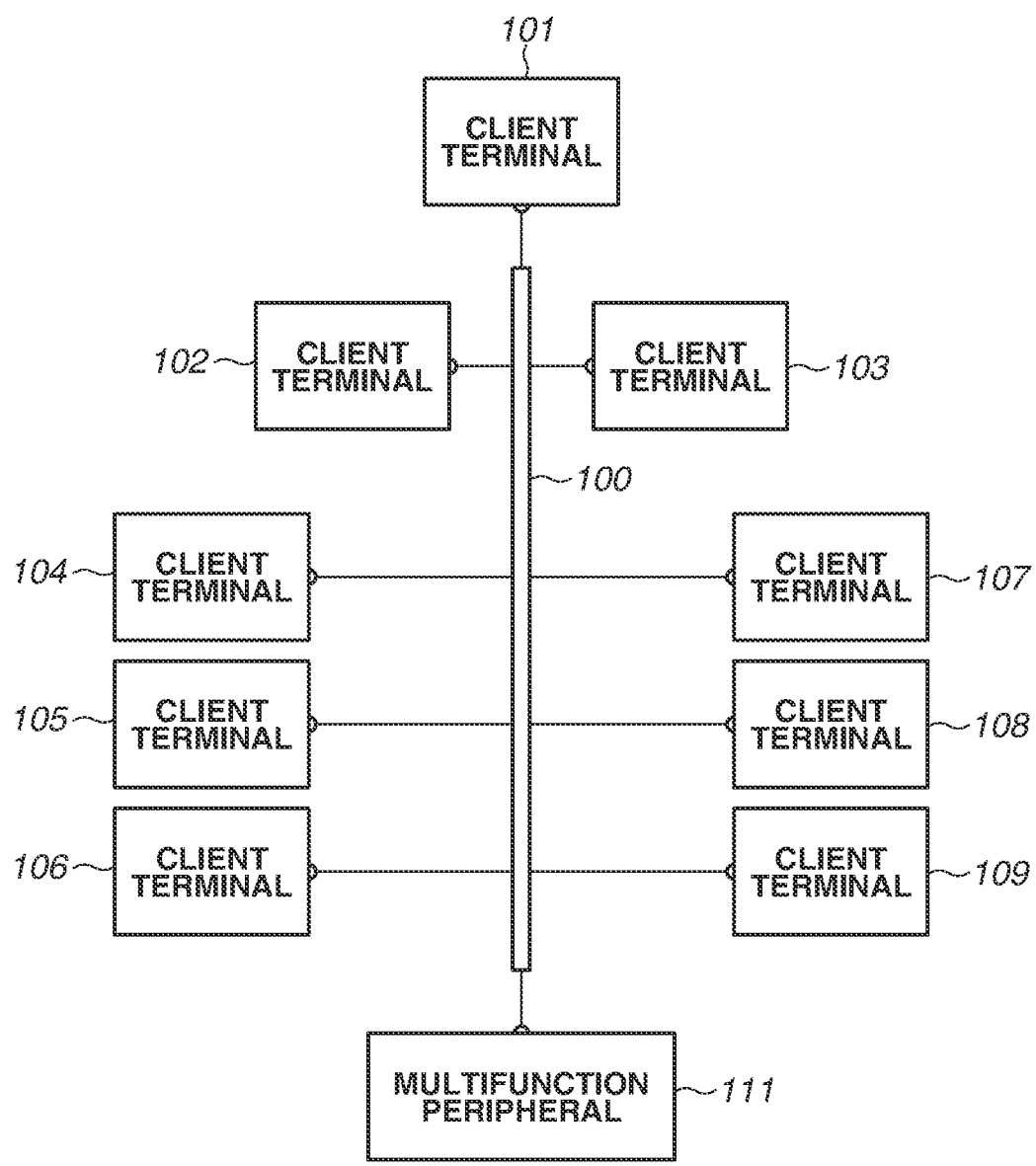

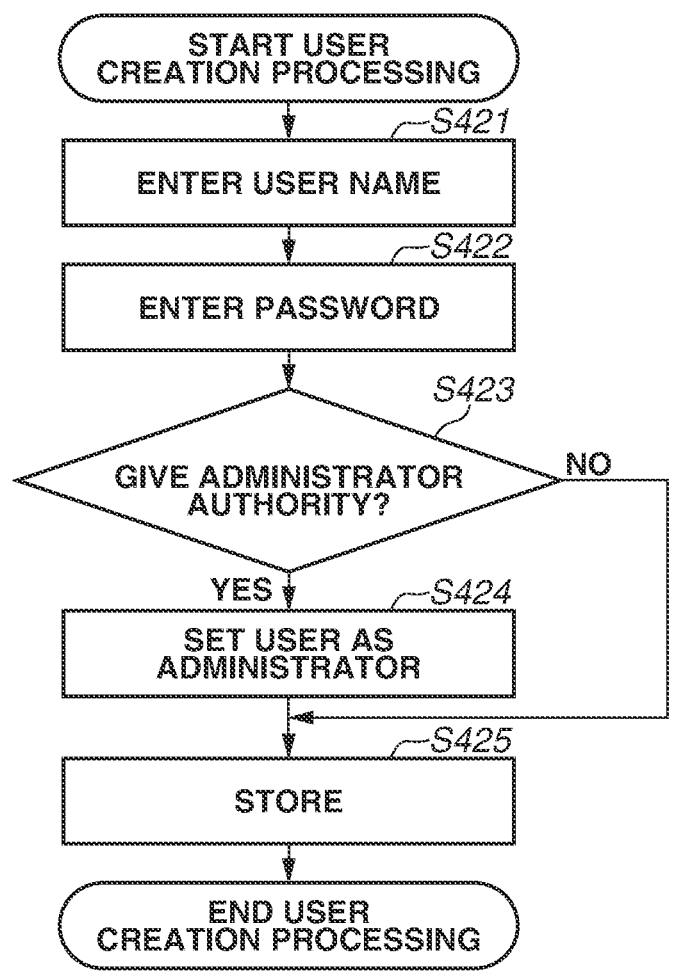

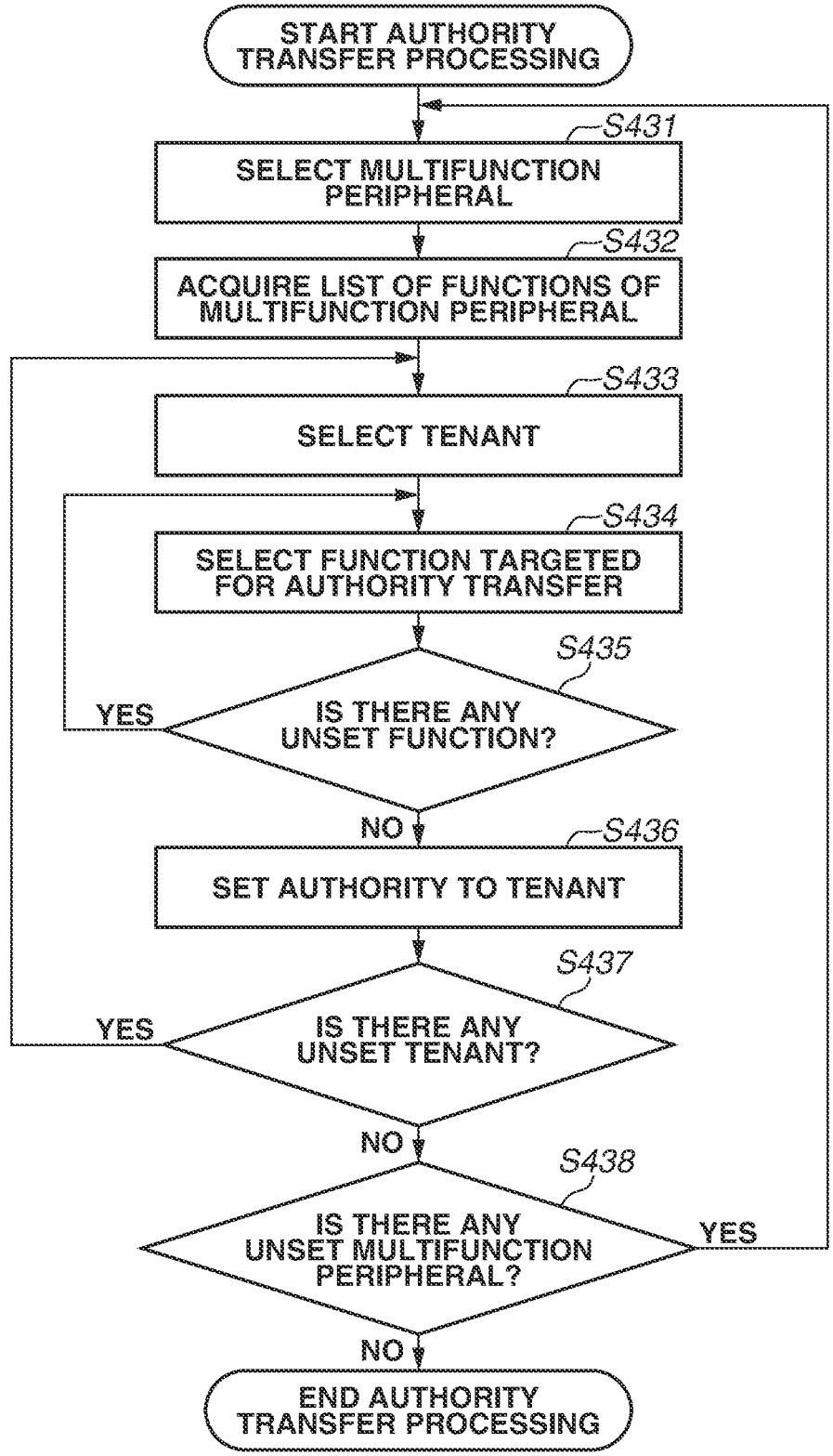

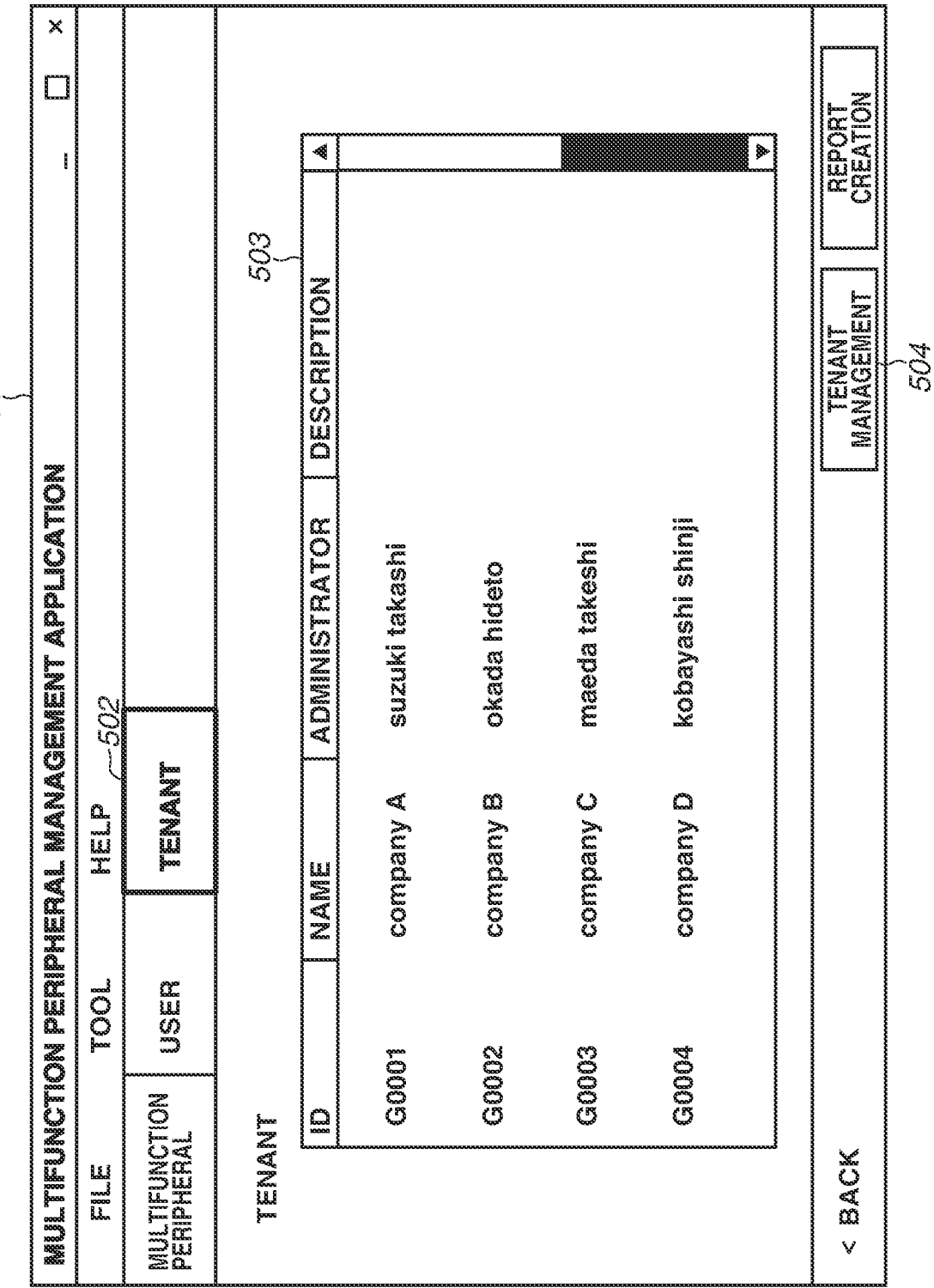

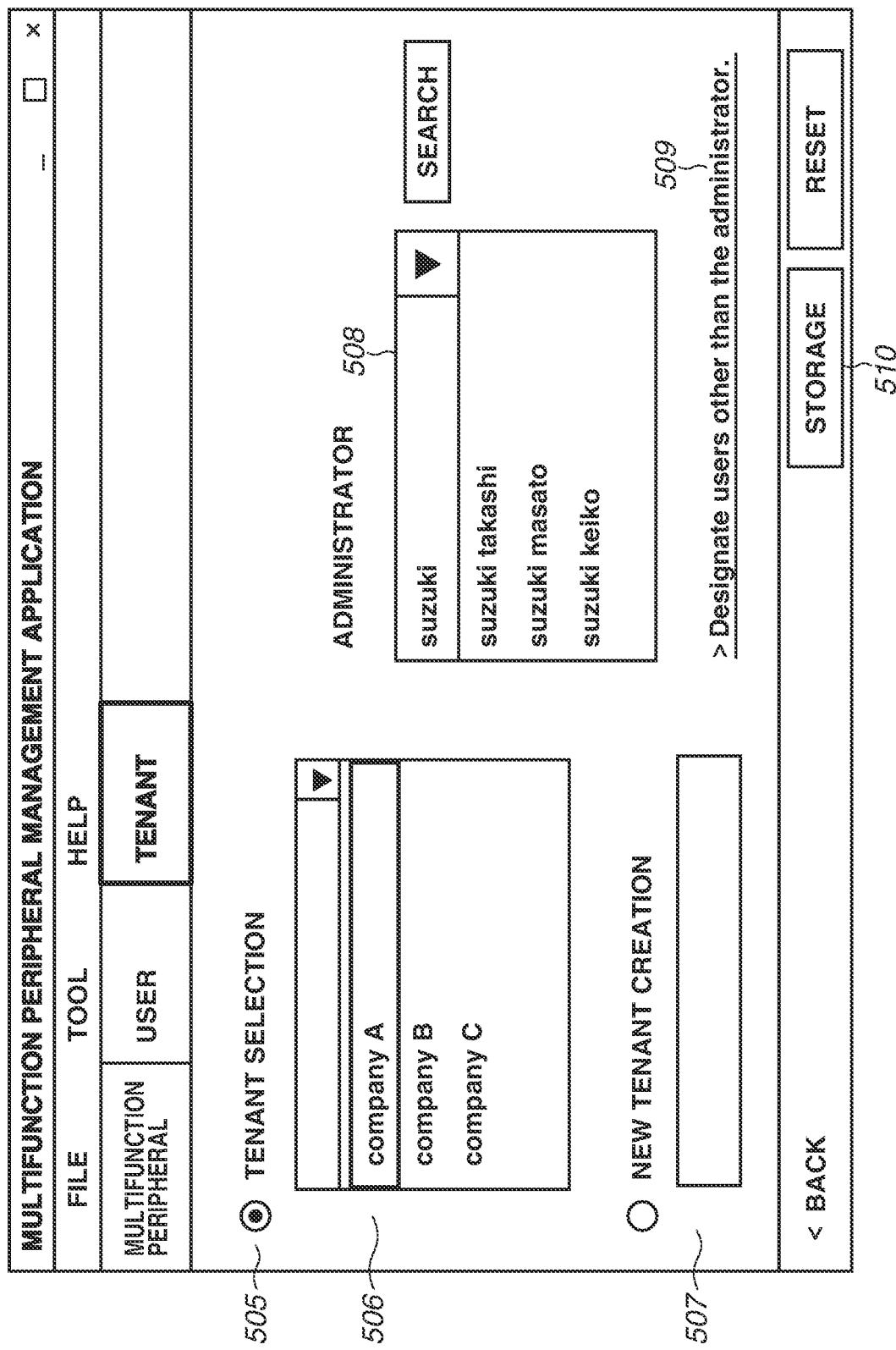

FIG.5D

MULTIFUNCTION PERIPHERAL MANAGEMENT APPLICATION

FILE  TOOL —521  HELP

MULTIFUNCTION PERIPHERAL | USER | TENANT

| ID | NAME | TENANT | ADMINISTRATOR | DESCRIPTION |
|---|---|---|---|---|
| E0101 | suzuki takashi | company A | ADMINISTRATOR | |
| E0102 | kato yoshihiro | | | |
| E0103 | takeda ayako | | | |
| E0104 | takahashi kenta | company B | | |

— 522

USER ADDITION — 523

< BACK

FIG.5F

| MULTIFUNCTION PERIPHERAL MANAGEMENT APPLICATION | | | | — □ × |
|---|---|---|---|---|
| FILE ~541 TOOL　　HELP | | | | |
| MULTIFUNCTION PERIPHERAL | USER | TENANT | | 542 |
| MULTIFUNCTION PERIPHERAL NAME | IP ADDRESS | MODEL NAME | DESCRIPTION | |
| 🖨 Dev001 | 192.168.1.1 | Canon C7050A | SECTION A, WITH FINISHER | |
| 🖨 Dev002 | 192.168.1.2 | Canon B5800 | SECTION B, MONOCHROME | |

543

| AUTHORITY SETTING | REPORT CREATION |

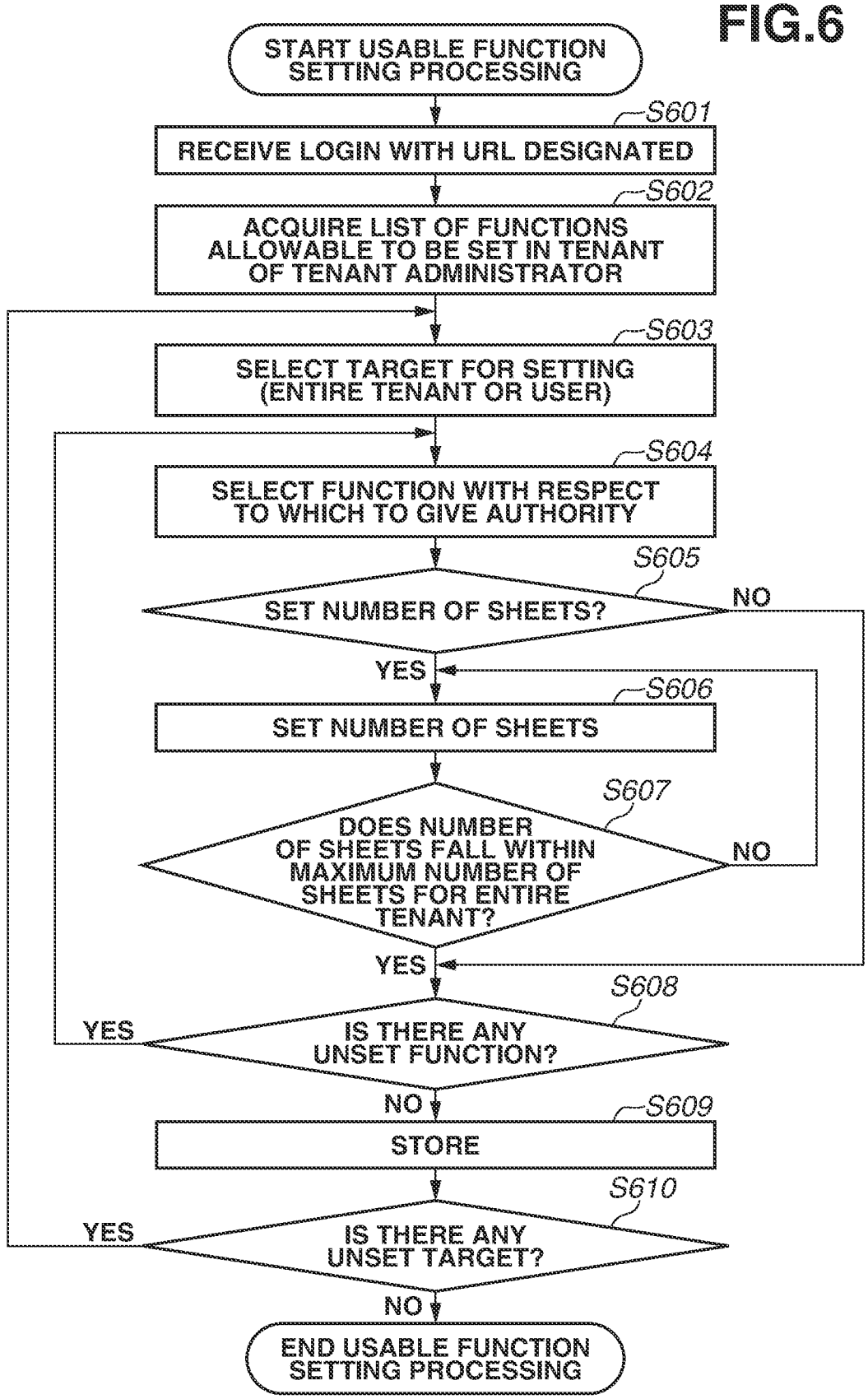

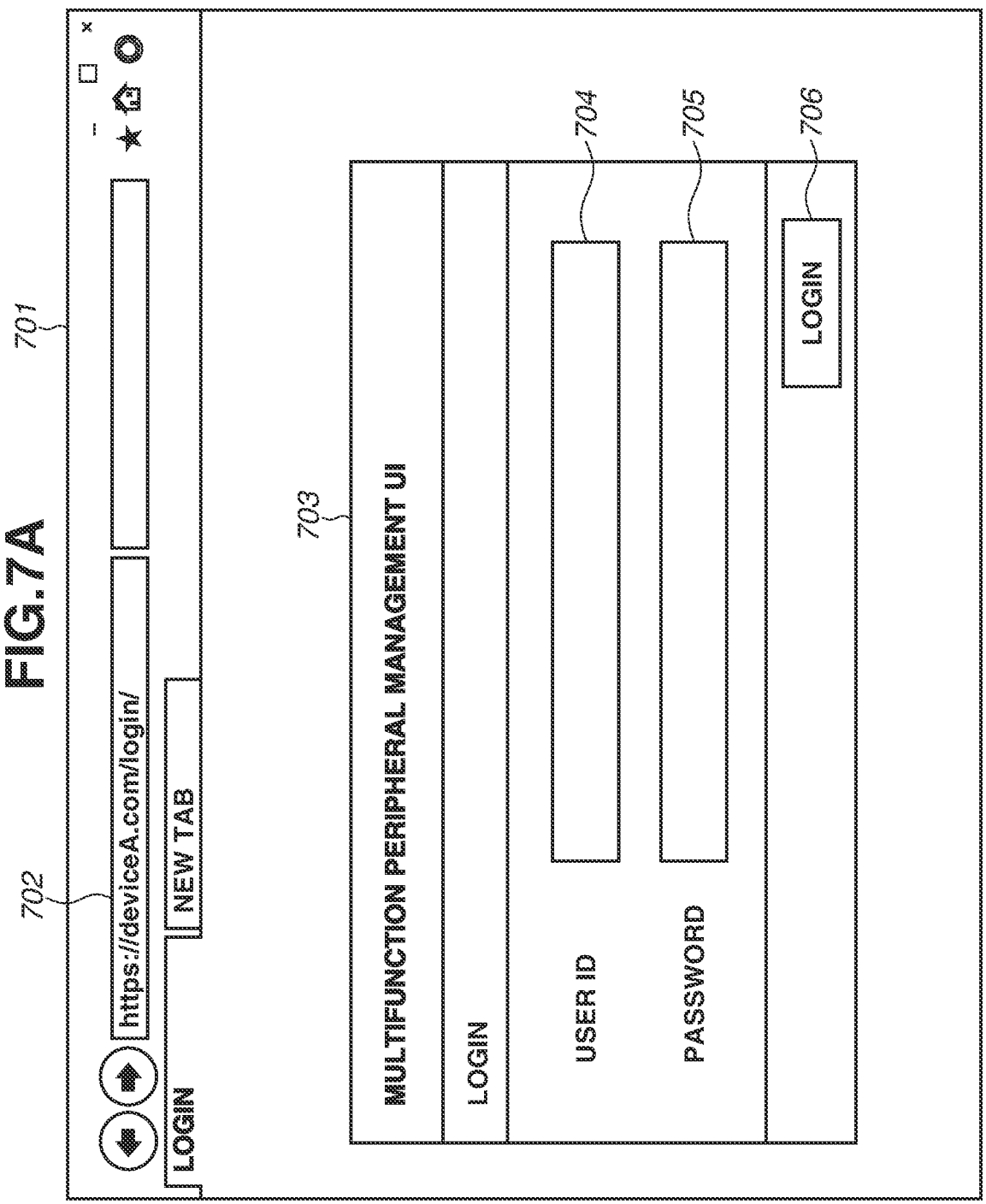

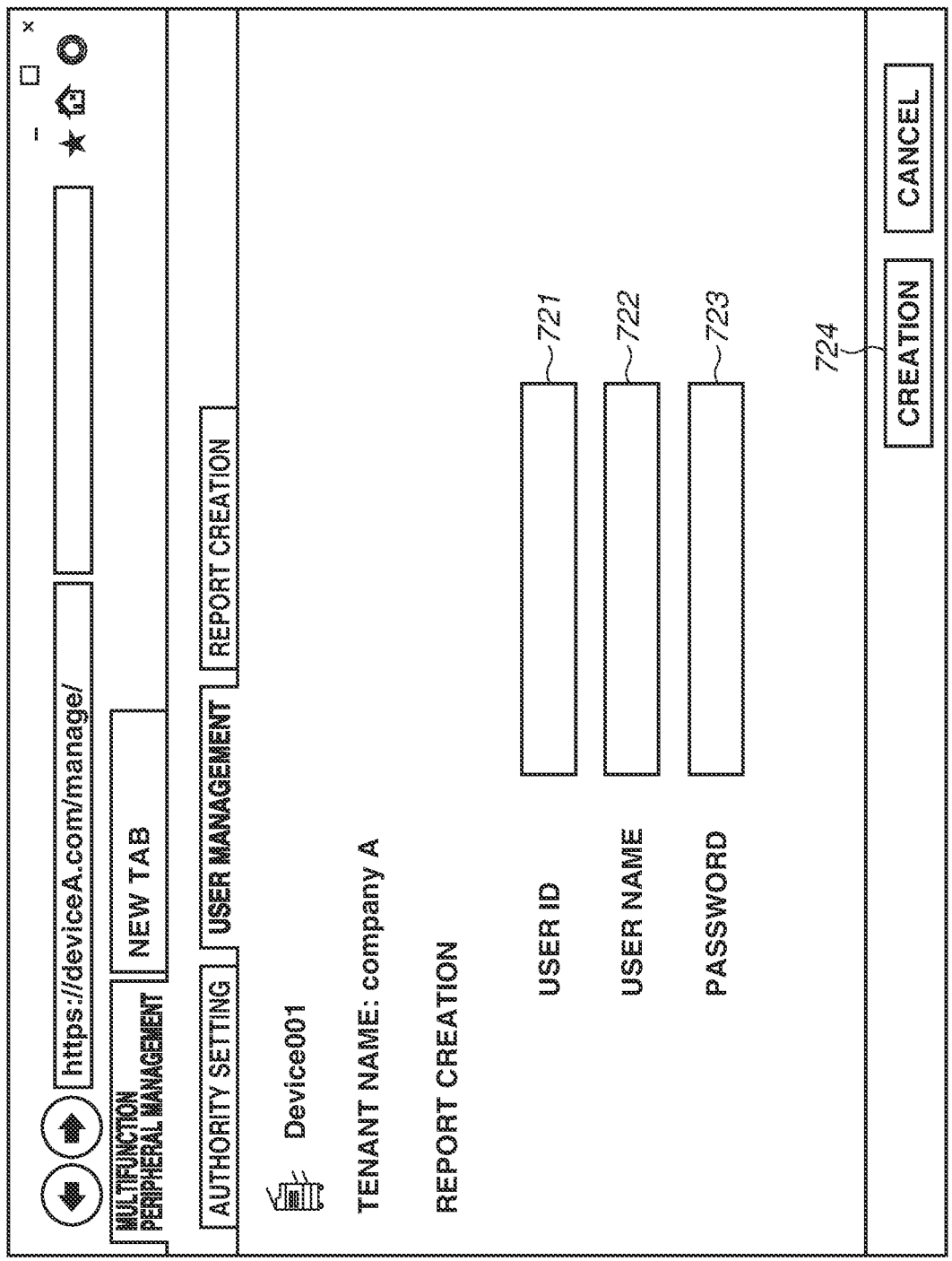

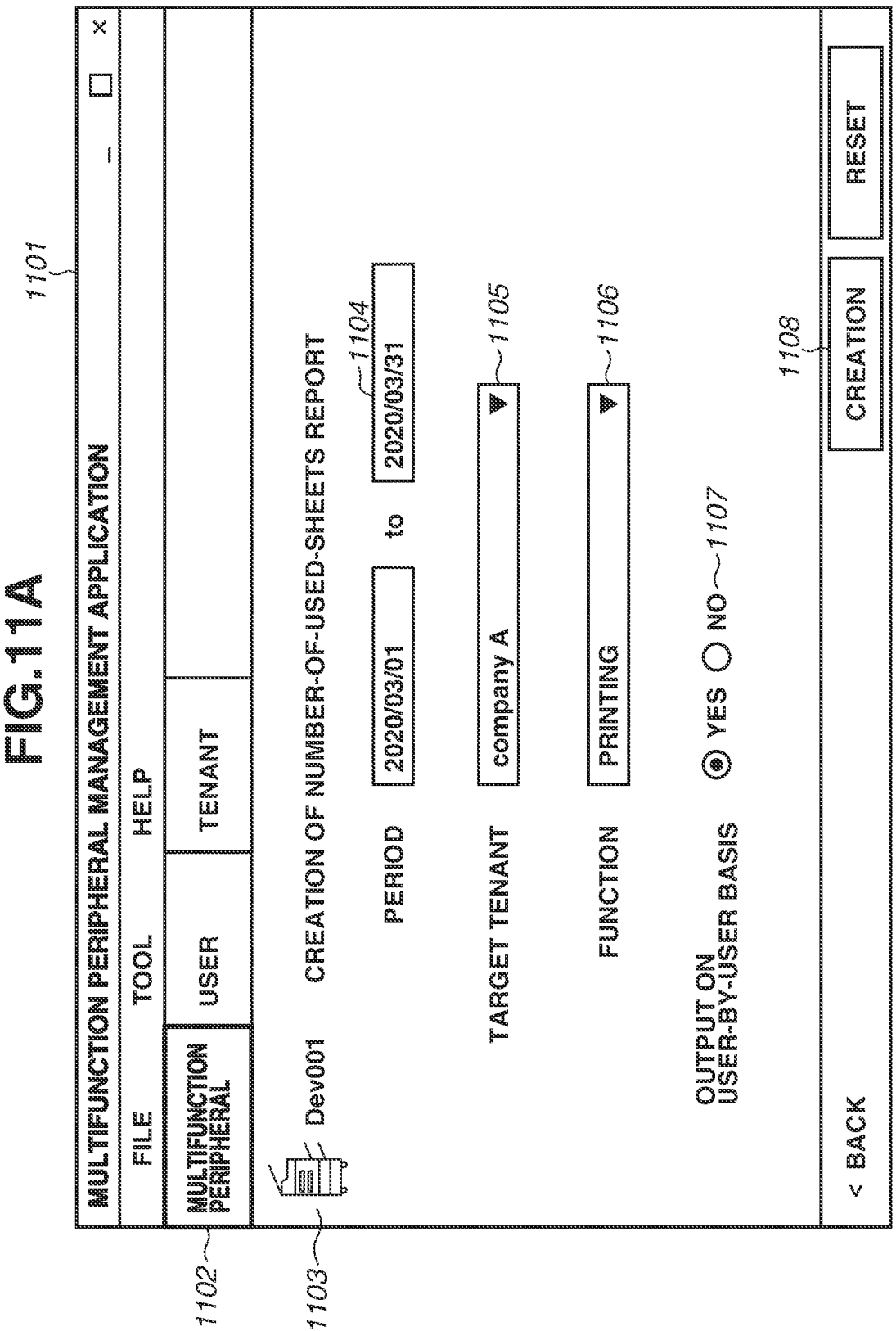

FIG.11B

MULTIFUNCTION PERIPHERAL MANAGEMENT APPLICATION

FILE  TOOL  HELP ~1111

| MULTIFUNCTION PERIPHERAL | USER | TENANT | company A — 1112    CREATION OF NUMBER-OF-USED-SHEETS REPORT

PERIOD  2020/03/01  to  2020/03/31

TARGET MULTIFUNCTION PERIPHERAL  ALL ▼ ~1113

FUNCTION  ALL ▼

OUTPUT ON USER-BY-USER BASIS  ⦿ YES  ○ NO

< BACK                    CREATION    RESET

| USER ID | NAME | TENANT | NUMBER OF PRINTED SHEETS | NUMBER OF FAX-TRANSMITTED SHEETS | TOTAL NUMBER OF SHEETS |
|---|---|---|---|---|---|
| E0101 | suzuki takashi | company A | 25 | 5 | 30 |
| E0102 | kato yoshihiro | company A | 19 | 0 | 19 |
| E0151 | mori shingo | company A | 147 | 88 | 235 |
| E0152 | hirata kazuo | company A | 86 | 37 | 123 |
| E0153 | sato hiroki | company A | 33 | 25 | 58 |
| TOTAL | — | — | 310 | 155 | 465 |

TOTAL: 465 SHEETS ~1124

NUMBER-OF-USED-SHEETS REPORT

| TENANT | company A |
|---|---|
| MULTIFUNCTION PERIPHERAL | Dev001 |
| PERIOD | 2020/03/01 to 2020/03/31 |
| TOTAL NUMBER OF SHEETS | 465 SHEETS |

REQUEST FOR CHANGING UPPER LIMIT OF NUMBER OF SHEETS (1511)

| | |
|---|---|
| FUNCTION | PRINTING |
| CURRENT UPPER LIMIT VALUE | 1000 SHEETS |
| NUMBER OF USED SHEETS THIS MONTH | 935 SHEETS |
| CHANGED UPPER LIMIT VALUE | [____] SHEETS (1512) |

[APPLICATION] (1513)  [CANCEL]

IMAGE PROCESSING APPARATUS AND CONTROL METHOD TO RESTRICT A FUNCTION THAT IS MADE AVAILABLE BY AN AUTHORITY

BACKGROUND

Field of the Disclosure

Aspects of the present disclosure generally relate to an image processing apparatus, a control method, and a storage medium, each of which is configured to restrict a function that is made available by an authority.

Description of the Related Art

Recently, a shared office, in which a plurality of companies uses an office floor in a shared manner, has been becoming popular. While there are a variety of forms of shared offices, a form in which a management company which manages a shared office exits and each of companies serving as users of the shard office makes a contract with the management company to rent a section of the shared office and pay rent is commonly used. There are many cases where the management company not only rents a place alone but also lends desks, chairs, and a multifunction peripheral such as a printer. These pieces of equipment include a thing which is exclusively usable by each of companies serving as users and a thing which is usable in a shared manner between the companies.

Here, assume a case where a multifunction peripheral is used in a shared manner between a plurality of companies. To enable recognizing who used the multifunction peripheral how much, each user is allowed to use the multifunction peripheral after being authenticated. Additionally, because of factors of, for example, security, it is conceivable to restrict functions of the multifunction peripheral, such as printing and facsimile (FAX), on a user-by-user basis. Therefore, Japanese Patent Application Laid-Open No. 2019-117539 discusses a method of restricting usage of the printing function of a printer on a user-by-user basis. This method ensures that, when an administrator restricts a function that is allowed to be executed by each individual user, each user is able to execute only the function allowed to be executed.

SUMMARY

According to an aspect of the present disclosure, an image processing apparatus having an image processing function including a print processing function and configured to allow an authenticated user to use the image processing function includes at least one first processor and at least one first memory coupled to the first processor and having stored thereon instructions that, when executed by the first processor, cause the first processor and the first memory to cooperate to act as a storing unit configured to store user information about users each given any one of an authority of shared office administrator, an authority of tenant administrator, and an authority of a general user belonging to a tenant, and a providing unit configured to provide, to a second user given the authority of tenant administrator from a first user having the authority of shared office administrator, a function of designating an allowable number of print sheets with respect to a tenant to which the second user belongs or a third user who belongs to the tenant to which the second user belongs, wherein, in a case where the third user, when authenticated, uses the print processing function, the third user is allowed to use the print processing function up to an allowable number of print sheets designated by the second user, who is a tenant administrator of the tenant to which the third user belongs.

Further features of the present disclosure will become apparent from the following description of exemplary embodiments with reference to the attached drawings.

BRIEF DESCRIPTION OF THE DRAWINGS

FIG. 1 is a diagram illustrating a network configuration.

FIG. 4B is a flowchart of processing for the shared office administrator to create a user according to the first exemplary embodiment.

FIG. 4C is a flowchart of processing for the shared office administrator to transfer an authority to a tenant administrator according to one or more aspects of the present disclosure.

FIG. 5A illustrates an example of a user interface (UI) via which to perform processing for the shared office administrator to create a tenant according to one or more aspects of the present disclosure.

FIG. 5B illustrates an example of a UI via which to perform processing for the shared office administrator to create a tenant according to one or more aspects of the present disclosure.

FIG. 5D illustrates an example of a UI via which to perform processing for the shared office administrator to create a user according to one or more aspects of the present disclosure.

FIG. 5F illustrates an example of a UI via which to perform processing for the shared office administrator to transfer an authority to a tenant administrator according to one or more aspects of the present disclosure.

FIG. 6 is a flowchart of processing for the tenant administrator to set whether to allow a general user to use a function of the multifunction peripheral according to one or more aspects of the present disclosure.

FIG. 7A illustrates an example of a UI via which to perform processing for the tenant administrator to set whether to allow a general user to use a function of the multifunction peripheral according to one or more aspects of the present disclosure.

FIG. 7C illustrates an example of a UI via which to perform processing for the tenant administrator to set whether to allow a general user to use a function of the multifunction peripheral according to one or more aspects of the present disclosure.

FIG. 11A illustrates an example of a UI via which to perform processing for the shared office administrator to create a report of the number of used sheets according to one or more aspects of the present disclosure.

FIG. 11B illustrates an example of a UI via which to perform processing for the shared office administrator to create a report of the number of used sheets according to one or more aspects of the present disclosure.

FIG. 11C illustrates an example of a UT via which to perform processing for the shared office administrator to create a report of the number of used sheets according to one or more aspects of the present disclosure.

FIG. 11D illustrates an example of a UI via which to perform processing for the shared office administrator to create a report of the number of used sheets according to one or more aspects of the present disclosure.

FIG. 12 illustrates an example of a UI via which to perform processing for the tenant administrator to create a report of the number of used sheets according to one or more aspects of the present disclosure.

FIG. 15B illustrates an example of a UI via which to perform processing for requesting a change of the upper limit value of the number of usable sheets according to one or more aspects of the present disclosure.

DESCRIPTION OF THE EMBODIMENTS

Figure 2A:
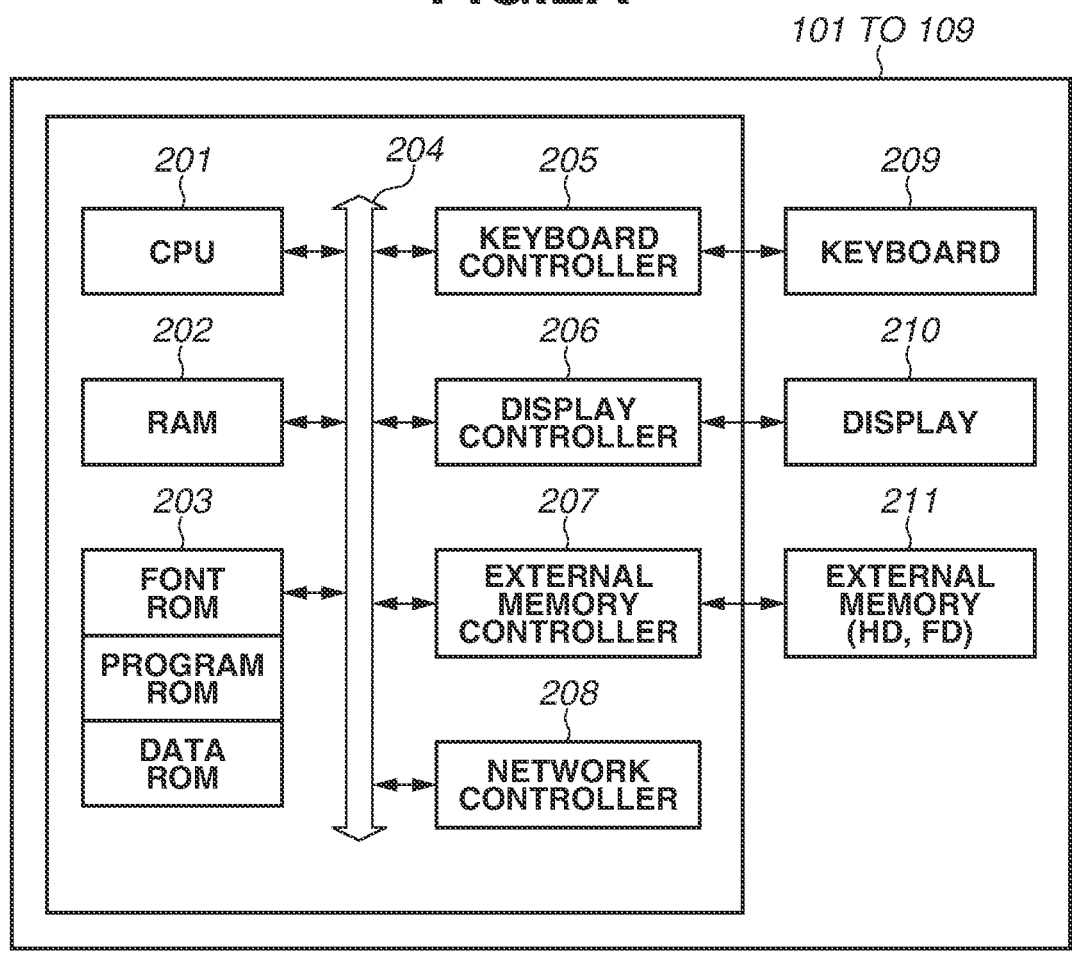
FIG. 2A is a configuration diagram of each of client terminals according to one or more aspects of the present disclosure.

In a multifunction peripheral, which is one type of image processing apparatus, the administrator of the multifunction peripheral is required to perform management thereof. The administrator of the multifunction peripheral in a shared office is the administrator of a management company for the shared office. On the other hand, it is assumed that a person who determines in what manner to allow a function of the multifunction peripheral to be used on a user-by-user basis is the administrator of a company to which a user belongs. However, there is a possibility that the administrator of each company which uses the shared office is not given the administration authority to manage a multifunction peripheral installed in the shared office. Therefore, the administrator of each company needs to request the administrator of the shared office, who has the administration authority for the multifunction peripheral, to perform settings of usage for each user. As a result, there is an issue in that a load on the administrator of the shared office increases.

Aspects of the present disclosure are generally directed to solving the above-mentioned issue by a first user who has an authority of shared office administrator giving an authority of tenant administrator to a second user to cause the second user of each company to set settings of usage for a user belonging to each company.

Various exemplary embodiments, features, and aspects of the disclosure will be described in detail below with reference to the drawings. An authority transfer system according to a first exemplary embodiment of the present disclosure is implemented on a network having a configuration such as that illustrated in FIG. 1. A network 100 which interconnects various constituent elements of the authority transfer system is a local area network (LAN), but can be a wide area network (WAN).

A client terminal 101 is a terminal which is to be operated by a shared office administrator. The shared office administrator performs management of a multifunction peripheral 111, including settings of authority transfer, by using the client terminal 101. Client terminals 102 and 103 are terminals which are to be operated by tenant administrators. While, assuming that a plurality of tenant administrators exists, two client terminals are illustrated, the respective roles thereof are the same. For example, the client terminal 102 is a terminal which is to be operated by the administrator of a tenant company A, and the client terminal 103 is a terminal which is to be operated by the administrator of a tenant company B. The respective tenant administrators use the respective terminals 102 and 103 to set, for example, functions of the multifunction peripheral 111 which are allowed to be used by employees of the respective companies.

Client terminals 104 to 109 are terminals which are to be operated by general users. Assuming that a plurality of general users exists, a plurality of client terminals are also illustrated. For example, the client terminals 104 to 106 are terminals which are to be operated by general users belonging to the tenant company A, and the client terminals 107 to 109 are terminals which are to be operated by general users belonging to the tenant company B. The general users use these terminals to instruct the multifunction peripheral 111 to perform printing or store a scanned document.

The multifunction peripheral 111 is capable of performing functions of, for example, printing, scanning, and facsimile. The multifunction peripheral 111 has an authentication function, so that, for example, a general user is able to be authenticated by holding an identification (ID) card over the multifunction peripheral 111.

The above-mentioned client terminals 101 to 109 and the multifunction peripheral 111 are interconnected by the LAN 100. Each client terminal is assumed to be, for example, a personal computer (PC) or a mobile terminal, but can be another type of terminal. While the inside of the multifunction peripheral 111 includes a hard disk, in which a database is operating, a configuration in which a separate database server exists can be employed. Moreover, a configuration in which a plurality of multifunction peripherals 111 exists can also be employed.

Figure 2B:
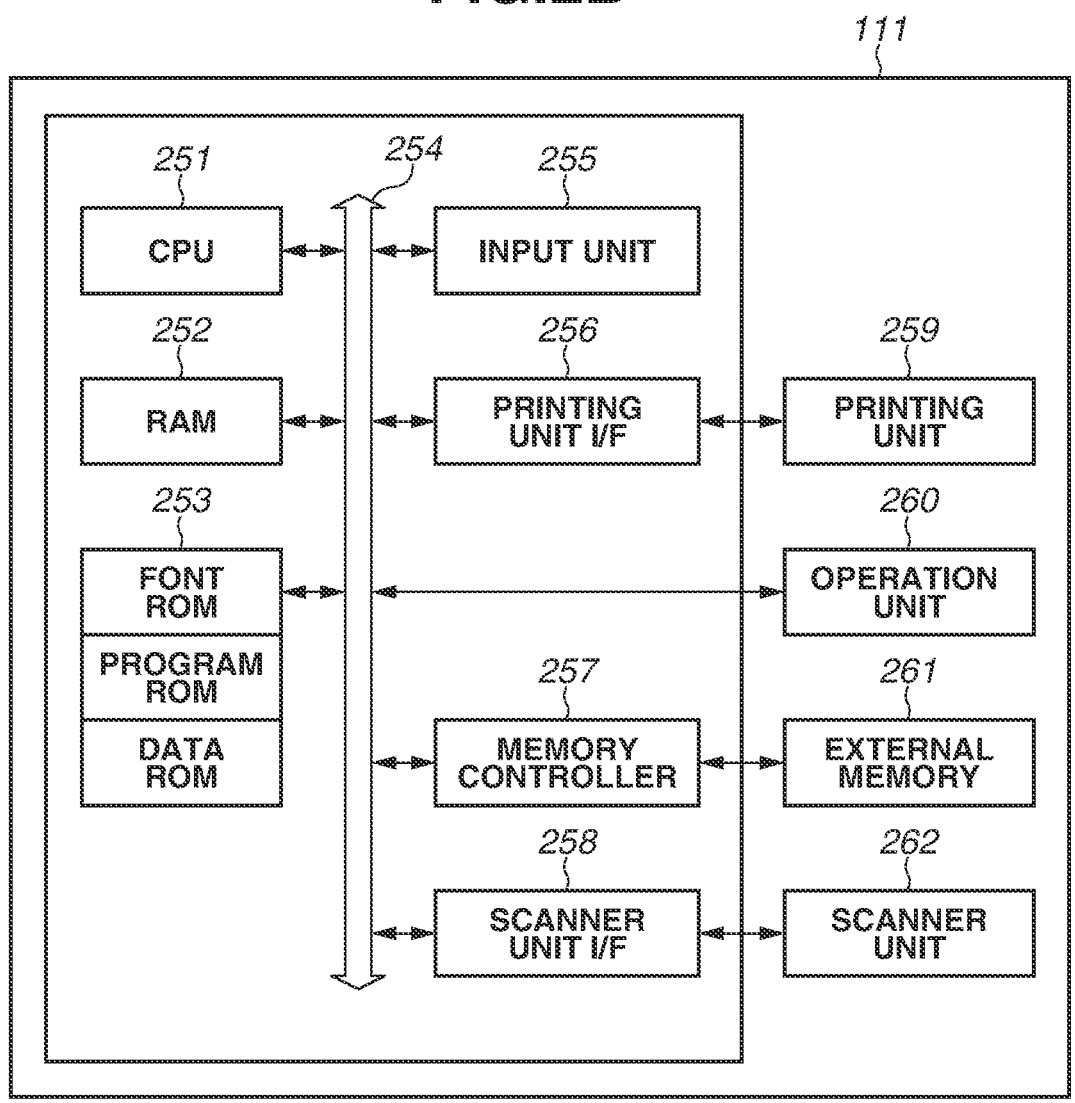
FIG. 2B is a configuration diagram of a multifunction peripheral according to one or more aspects of the present disclosure.

FIGS. 2A and 2B are diagrams illustrating hardware configurations of each the client terminals 101 to 109 and the multifunction peripheral 111, respectively, according to the first exemplary embodiment. FIG. 2A is a diagram illustrating a hardware configuration of each of the client terminals 101 to 109. A hardware block diagram illustrated in FIG. 2A is assumed to be equivalent to a hardware block diagram of a general information processing apparatus, so that a hardware configuration of the general information processing apparatus is applicable to each client terminal in the first exemplary embodiment.

Referring to FIG. 2A, a central processing unit (CPU) 201 executes programs, such as an OS and applications, stored in a program read-only memory (ROM) of ROMs 203 or loaded from an external memory 211, such as a hard disk (HD), onto a random access memory (RAM) 202, and thus controls respective blocks connected to a system bus 204. Here, "OS" is an abbreviation for an operating system which runs on a computer. Processing in each flowchart described below is able to be implemented by execution of such programs. The RAM 202 functions as, for example, a main memory and work area for the CPU 201. A keyboard controller 205 controls key inputs supplied from a keyboard 209 or a pointing device (not illustrated). A display controller 206 controls displaying to be performed by a display 210. An external memory controller 207 controls data access to the external memory 211, such as an HD or a floppy disk (FD), which stores various pieces of data. A network controller 208 is connected to a network via the system bus 204 and performs communication control processing for communication with other devices connected to the network.

Furthermore, in the following entire description, unless otherwise stated, in each terminal, the subject of program execution on hardware is the CPU 201, and the subject of program execution on software is an application program installed on the external memory 211.

FIG. 2B illustrates a configuration of the multifunction peripheral 111, which includes a plurality of image processing functions, according to the first exemplary embodiment. As illustrated in FIG. 2B, in the multifunction peripheral 111, a CPU 251 included in the multifunction peripheral 111 controls each block connected to a system bus 254 based on control programs stored in ROMs 253 and an external memory 261. An image signal generated by processing performed by the CPU 251 is output as output information to a printing unit (multifunction peripheral engine) 259 via a printing unit interface (U/F) 256.

The CPU 251 is configured to be able to perform communication processing for communication with each client terminal via an input unit 255. A program ROM included in the ROMs 253 stores, for example, control programs for the CPU 251. A font ROM included in the ROMs 253 stores, for example, font data which is used in generating output information. A RAM 252 is a RAM which functions as, for example, a main memory and work area for the CPU 251, and is configured to allow the memory capacity thereof to be extended with an optional RAM being connected to an extension port (not illustrated). Moreover, the RAM 252 is used as, for example, an output information loading region, an environmental data storage region, and a non-volatile random access memory (NVRAM). The external memory 261, the access to which is controlled by a memory controller 257, stores, for example, font data, programs, and form data. Moreover, an operation unit 260 is configured with, for example, switches for operation and a light-emitting diode (LED) display device.

A scanner unit I/F 258 performs correction, modification, and editing on image data received from a scanner unit 262. The scanner unit 262 is configured to input, to a charge-coupled device (CCD) sensor, reflected light obtained by scanning and exposing an image on a document, thus converting information about the image into an electrical signal. Additionally, the scanner unit 262 converts the electrical signal into a luminance signal composed of three colors, i.e., red (G), green (G), and blue (B), and reads the luminance signal as image data. When the user issues a reading instruction via the operation unit 260, a document reading instruction is given to the scanner unit 262. Upon receiving the document reading instruction, the scanner unit 262 performs a document reading operation. Furthermore, the document reading method can be the form of automatic feeding method in which a document is set at a document feeder (not illustrated). Moreover, the document reading method can be a method in which a document is placed on a glass surface (not illustrated) and scanning of the document is performed by an exposure unit being moved. As mentioned above, the multifunction peripheral 111 is an image processing apparatus having a plurality of image processing functions, and the multifunction peripheral 111 in the first exemplary embodiment is an image processing apparatus having a print processing function and a scan processing function.

Furthermore, in the following entire description, unless otherwise stated, in the multifunction peripheral 111, the subject of program execution on hardware is the CPU 251, and the subject of program execution on software is an application program installed on the external memory 261.

Figure 3:
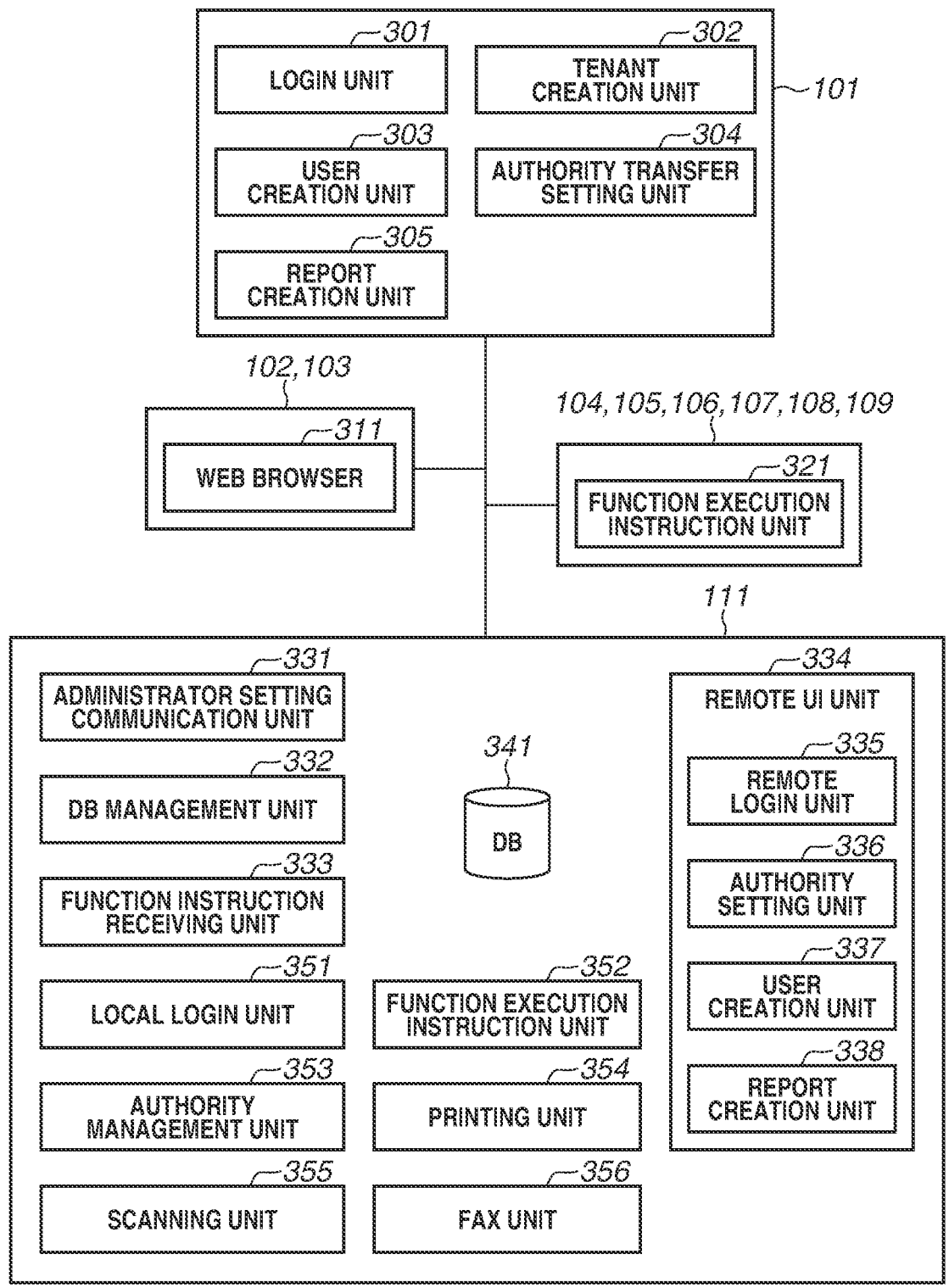
FIG. 3 is a diagram illustrating functional blocks of software according to one or more aspects of the present disclosure.

FIG. 3 is a diagram illustrating functional blocks of the terminals 101 to 109 and the multifunction peripheral 111 according to the first exemplary embodiment. The functional blocks illustrated in FIG. 3 are included in the terminals 101 to 109 and the multifunction peripheral 111. The functional blocks illustrated in FIG. 3 are implemented by the CPUs 201 and 251 executing the respective types of control programs.

The terminal 101 includes a login unit 301, a tenant creation unit 302, a user creation unit 303, an authority transfer setting unit 304, and a report creation unit 305. The login unit 301 authenticates a shared office administrator with use of, for example, a user ID and a password. After being authenticated, the shared office administrator becomes able to perform the respective functions. The tenant creation unit 302 creates a group to which to transfer an authority to set whether to allow usage of a function of the multifunction peripheral 111, and designates an administrator of the created group. For example, if a company A uses a shared office, the tenant creation unit 302 creates a tenant company A and designates a tenant administrator of the tenant company A. The user creation unit 303 creates a tenant administrator or a general user. Creation of a general user can be performed by the tenant administrator or can be performed by the shared office administrator.

The authority transfer setting unit 304 transfers, to the tenant administrator, an authority to set whether to allow usage of a function of the multifunction peripheral 111. The functions of the multifunction peripheral 111 are considered to include, for example, printing, scanning, facsimile (FAX), connection to a cloud, and connection to a Universal Serial Bus (USB) storage. With regard to transfer of the authority, the respective functions are able to be designated for each tenant. Thus, for example, a setting in which, while the tenant administrator of the company A is given an authority to set whether to allow usage of functions of printing, scanning, and FAX, the tenant administrator of the company B is given only an authority to set whether to allow usage of functions of printing and scanning can be performed.

The tenant administrator is able to set, only within the range given by the authority transfer setting unit 304, a function which a general user belonging to the same tenant as the tenant to which the tenant administrator belongs is allowed to use. Moreover, among the functions, with regard to the function of outputting sheets, not only setting as to whether to allow execution but also restriction of the number of sheets allowed to be output is able to be performed. For example, while a given general user is allowed to use a printing function, the number of sheets allowed to be output for the printing function is designated as up to 100 sheets per month. The shared office administrator sets, with respect to each tenant, the number of sheets serving as an upper limit for each function. For example, the company A is set to receive a designation of 1000 sheets per month, and the company B is set to receive a designation of 2000 sheets per month. The tenant administrator allocates, within the set range, the allowable number of output sheets to a general user. In a case where the shared office administrator has not designated the allowable number of output sheets with respect to a tenant, the tenant becomes allowed to output sheets without any limitation.

The report creation unit 305 creates a report of the number of sheets on a paper basis which a general user caused the multifunction peripheral 111 to output. Setting of the report is not limited to a setting about the function of actually outputting sheets of paper and can be a setting about even the function of not discharging sheets of paper, such as a scanning function. The shared office administrator is able to create reports about all of the tenants and all of the general users, but is able to perform, at the time of creation of reports, narrowing down of the range, such as designating tenants, or adjustment of the granularity, such as determining whether to also include information about general users. Moreover, the shared office administrator is also able to designate, for example, outputting on a multifunction peripheral-by-multifunction peripheral basis or outputting on a tenant-by-tenant basis.

Furthermore, while a configuration in which the shared office administrator is able to directly set a function which a general user is allowed to use in the multifunction peripheral 111 can be employed, such a configuration is omitted from description in the present exemplary embodiment. Moreover, while each functional unit is assumed to operate on an application installed on the terminal 101, a configuration in which the multifunction peripheral 111 is configured to include the above-mentioned functions and the shared office administrator accesses the multifunction peripheral 111 via a web browser of the terminal 101 to use each function can be employed.

Each of the terminals 102 and 103 includes a web browser 311. The web browser 311 operates as a client for a remote user interface (UI) unit 334, which operates on the multifunction peripheral 111. Each of the terminals 104 to 109 includes a function execution instruction unit 321. The function execution instruction unit 321 instructs the multifunction peripheral 111 to perform, for example, printing or facsimile. In the case of an environment for a shared office, since, for example, at the time of execution of printing, authentication printing, in which user information is appended to an instruction from the function execution instruction unit 321 and the multifunction peripheral 111 performs user authentication to execute the printing function, is considered to be commonly used, the present exemplary embodiment is described based on such a premise. However, if a configuration in which the multifunction peripheral 111 directly executes the function in response to an instruction from the function execution instruction unit 321 without performing authentication is employed, in that case, execution of a function which is not allowed to be executed is controlled by the function execution instruction unit 321.

The multifunction peripheral 111 includes an administrator setting communication unit 331, a database (DB) management unit 332, a function instruction receiving unit 333, a remote UI unit 334, a remote login unit 335, an authority setting unit 336, a user creation unit 337, a report creation unit 338, a DB 341, a local login unit 351, a function execution instruction unit 352, an authority management unit 353, a printing unit 354, a scanning unit 355, and a facsimile (FAX) unit 356. Out of these units, the administrator setting communication unit 331, the DB management unit 332, the function instruction receiving unit 333, the remote UI unit 334, the remote login unit 335, the authority setting unit 336, the user creation unit 337, and the report creation unit 338 operate when performing interaction with the terminals 101 to 109. The local login unit 351, the function execution instruction unit 352, the authority management unit 353, the printing unit 354, the scanning unit 355, and the FAX unit 356 operate when a general user has operated the multifunction peripheral 111.

The administrator setting communication unit 331 communicates with the respective functional units of the terminal 101 and receives and passes, to the DB management unit 332, tenant information, user information, and authority information. The DB management unit 332 performs writing of information such as user information, tenant information, and authority information into the DB 341 in response to requests received from the administrator setting communication unit 331 and the remote UI unit 334, or performs reading of such information from the DB 341 in response to such requests. The DB 341 is a database which stores data such as that mentioned above. The data to be stored is described below. The function instruction receiving unit 333 receives a function instruction for, for example, print processing from each of the terminals 104 to 109. As mentioned above, for example, print processing is not immediately performed but is performed after the function instruction receiving unit 333 temporarily retains print data and the user then performs authentication on the multifunction peripheral 111. The function instruction receiving unit 333 can be executed by an external server such as a print server.

The remote UI unit 334 operates as a web server, and creates and transmits a web page in response to access from each of the terminals 102 and 103. The remote UI unit 334 internally includes the remote login unit 335, the authority setting unit 336, the user creation unit 337, and the report creation unit 338. The remote login unit 335 authenticates a tenant administrator with use of, for example, a user ID and a password as with the login unit 301 of the terminal 101. After being authenticated, the tenant administrator becomes able to perform the respective functions. The user creation unit 337 creates a general user belonging to a tenant which the tenant administrator manages. The user creation unit 337 is unable to create a general user belonging to a different tenant.

The authority setting unit 336 sets a function which is individually allowed to be used to a general user belonging to a tenant. Functions which are settable here are limited to functions which the shared office administrator allowed via the authority transfer setting unit 304. The allowable number of output sheets is also settable. While the allowable number of output sheets, when not being set, becomes unlimited, even if no upper limit is set to a general user, if an upper limit is set to a tenant, the general user is not able to perform printing beyond the upper limit number of output sheets. The report creation unit 338 creates a report of the number of output sheets which a general user included in the tenant which the tenant administrator manages used. The report creation unit 338 is configured to be able to designate, for example, the granularity of information at the time of creation of a report as with the report creation unit 305.

These functional units included in the remote UI unit 334 also perform exchange of data with the DB 341 via the DB management unit 332. Furthermore, a configuration in which the remote UI unit 334 and the respective functional units included therein are incorporated into an external web server can be employed. Here, an example of pieces of information which the DB 341 stores is shown as follows. Table 1 shows an example of a user table which the multifunction peripheral 111 stores.

TABLE 1

User Table

| User ID | User name | Tenant ID | Role ID |
|---------|-----------|-----------|---------|
| E0001 | tanaka nobuo | — | SA |
| E0101 | suzuki takashi | T0001 | TA0001 |
| E0102 | kato yoshihiro | T0001 | R0001 |
| . | . | . | . |
| . | . | . | . |
| . | . | . | . |

The column "user ID" indicates an ID for uniquely identifying a user. Users include not only general users but also a shared office administrator and a tenant administrator. The column "user name" indicates the name of a user, which is designated at the time of creation of user information. The column "tenant ID" indicates an ID for uniquely identifying a tenant. The column "role ID" indicates an ID for uniquely identifying a role, and the role is an aggregation of a plurality of authorities. The role is described below with reference to Table 3 or Table 4. In this example, the user of E0102 is able to execute a function allowed with the role of R0001.

TABLE 2

Tenant Table

| Tenant ID | Tenant name | Role ID |
|-----------|-------------|---------|
| T0001 | company A | R0101 |
| T0002 | company B | R0102 |
| T0003 | company C | R0103 |
| . | . | . |
| . | . | . |
| . | . | . |

Table 2 shows an example of a tenant table, and the column "tenant ID" indicates an ID for uniquely identifying a tenant. The column "tenant name" indicates the name of a tenant, which is designated at the time of creation of a tenant. The column "role ID" indicates an ID for uniquely identifying a role imparted for a tenant.

TABLE 3

Administrator Role Table

| Role ID | Authority transfer | Tenant creation | Administrator setting | Report creation |
|---------|--------------------|-----------------|-----------------------|-----------------|
| SA | Yes | Yes | Yes | Yes |
| TA0001 | No | No | No | Yes |

| User creation | Setting as to whether to allow printing | Setting as to whether to allow scanning | Setting as to whether to allow FAX transmission |
|---------------|-----------------------------------------|-----------------------------------------|-------------------------------------------------|
| Yes | Yes | Yes | Yes |
| Yes | Yes | Yes | No |

| Setting as to whether to allow FAX reception | Setting as to whether to allow cloud connection | Setting as to whether to allow USB printing | Setting as to whether to allow USB scanning |
|----------------------------------------------|-------------------------------------------------|---------------------------------------------|---------------------------------------------|
| Yes | Yes | Yes | Yes |
| No | No | Yes | Yes |

Table 3 shows an example of a role table about a shared office administrator and a tenant administrator, and the column "role ID" indicates an ID for uniquely identifying a role. The columns "authority transfer", "tenant creation", "administrator setting", "report creation", "user creation", and various settings about authorities, which are various other attributes, indicate functions, and an aggregation of such authorities allowed or not allowed is a role. For example, "SA" is a role which is set to the shared office administrator and to which all of the authorities are allocated. The role which is set to the shared office administrator, i.e., "SA", is basically fixed. Moreover, "TA0001" is a role which is set to the tenant administrator, in which authority transfer, tenant creation, and administrator setting are not able to be executed. While report creation and user creation are able to be executed, the range which the tenant administrator is able to execute is limited to the inside of a tenant to which the tenant administrator belongs. Setting as to whether to allow printing and subsequent settings are authorities for setting whether to allow usage of such functions. The shared office administrator is able to execute all of the functions. The functions allowed to be executed by the shared office administrator can be set to the tenant administrator.

TABLE 4

General User/tenant Role Table

| Role ID | Printing | Scanning | FAX transmission |
|---------|----------|----------|------------------|
| R0001 | Yes | Yes | Yes |
| R0002 | Yes | Yes | No |
| . | . | . | . |
| . | . | . | . |
| . | . | . | . |

| FAX reception | Cloud connection | USB connection |
|---------------|------------------|----------------|
| Yes | Yes | Yes |
| Yes | No | No |
| . | . | . |
| . | . | . |
| . | . | . |

Table 4 shows an example of a role table about a general user and a tenant. The configuration of the role table about a general user and a tenant is similar to that of the administrator role table except that functions which only the shared office administrator and the tenant administrator are able to execute are not present. In this example, the role of R0001 is able to execute all of the functions of printing, scanning, FAX transmission, FAX reception, cloud connection, and USB connection.

On the other hand, the role of R0002 is not able to execute the functions of FAX transmission and cloud connection. If, when functions allowed to be used are allocated to a general user or a tenant, a combination of authorities of such functions is not present, a role is created anew. If such a combination of authorities is already present, the applicable role ID is allocated to a user. In a case where changing of the authority of a general user or a tenant has been performed, since, if the role is rewritten, the authority of another user or another tenant is also changed, a different role is allocated or a new role is created. Furthermore, while a method or UI for directly operating a role is not described in the present exemplary embodiment, a configuration in which using such a method or UI enables changing authorities of a plurality of users at one time can be employed. Furthermore, the administrator role table and the general user/tenant role table can be put together into one table, and, in that case, attributes of the two tables are directly arranged side by side horizontally.

TABLE 5

User Number-of-Sheets Management Table

| User ID | Allowable number of print sheets | Allowable number of FAX transmission sheets | Number of printed sheets last month |
|---|---|---|---|
| E0001 | — | — | 155 |
| E0101 | — | 100 | 52 |
| E0102 | 100 | 0 | 39 |
| . | . | . | . |
| . | . | . | . |
| . | . | . | . |

| Number of printed sheets this month | Number of FAX-transmitted sheets last month | Number of FAX-transmitted sheets this month |
|---|---|---|
| 120 | 42 | 19 |
| 38 | 15 | 4 |
| 14 | 0 | 0 |
| . | . | . |
| . | . | . |
| . | . | . |

Table 5 is a table used to manage limitations of the allowable numbers of sheets in general users, and the column "user ID" indicates an identification (ID) for uniquely identifying a user. The column "allowable number of print sheets" indicates the upper limit of the number of sheets which are allowed to be printed by a user. While, in this example, all of the numbers of sheets are assumed on a monthly basis, a different time period can be configured to be set. A user for whom no value is specified is allowed to perform printing without limitation. The column "allowable number of FAX transmission sheets" similarly indicates the upper limit of the number of sheets which are allowed to be FAX-transmitted by a user. Besides, upper limit values of the number of sheets are able to be set according to functions, but the description thereof is omitted.

The column "number of printed sheets last month" indicates the number of sheets actually printed last month. The column "number of printed sheets this month" indicates the number of sheets printed this month or, if in the middle of the month, the number of sheets printed until the middle. The same applies to FAX transmission. While, in this example, only values until the last month are retained, values until the earlier time can be retained. Moreover, values can be retained not in units of month but in other units such as week or year. When each user has executed a function such as printing, a log of the executed function is recorded, so that aggregating such logs enables flexibly creating a report with respect to information about the number of printed sheets. Therefore, values do not need to be retained as a table, but a table is retained to reduce a load of aggregate calculation.

TABLE 6

Tenant Number-of-Sheets Table

| Tenant ID | Allowable number of print sheets | Allowable number of FAX transmission sheets | Number of printed sheets last month |
|---|---|---|---|
| T0001 | 1000 | 300 | 836 |
| T0002 | — | — | 1532 |
| T0003 | — | 700 | 367 |
| . | . | . | . |
| . | . | . | . |
| . | . | . | . |

| Number of printed sheets this month | Number of FAX-transmitted sheets last month | Number of FAX-transmitted sheets this month |
|---|---|---|
| 511 | 87 | 53 |
| 1117 | 323 | 279 |
| 421 | 347 | 373 |
| . | . | . |
| . | . | . |
| . | . | . |

Table 6 is a table used to manage limitations of the numbers of sheets in tenants. The same configuration as that of the user number-of-sheets management table is employed, and the upper limit of the allowable number of usable sheets in each function for each tenant and the usage condition thereof are recorded. With respect to the sum of the numbers of sheets used by users belonging to each tenant, values defined in this table serve as upper limits. However, it can be possible that the sum of the allowable numbers of print sheets for the respective users exceeds the allowable number of print sheets for the tenant. Thus, even when the allowable number of print sheets for the tenant is 100, the allowable numbers of print sheets for the users E0001, E0002, and E0003 can be 80, 70, and 60, respectively. At a point of time when the sum of the numbers of actually printed sheets has exceeded 100, every user belonging to the tenant becomes unable to perform printing. Since, in that case, each general user becomes unable to recognize the remaining allowable number of sheets usable for the general user, to avoid such a situation, the tenant administrator can allocate the allowable number of sheets to the respective general users in such a manner that the sum of the allowable numbers of sheets allocated to the respective general users does not exceed the upper limit value allocated to the tenant. The user number-of-sheets management table and the tenant number-of-sheets management table can be put together with the user table and the tenant table, respectively, each into one table.

As mentioned above, the DB 341 can exist as a DB server outside the multifunction peripheral 111. In that case, user information is able to be shared between multifunction peripherals. Thus, in a case where a plurality of multifunction peripherals exists, the same user does not need to be created a plurality of times, so that, once a user is created, only settings of authorities need to be performed between the multifunction peripherals.

Referring back to FIG. 3, the local login unit 351 of the multifunction peripheral 111 authenticates a user who intends to use the multifunction peripheral 111. A configuration in which the user logs in by inputting an ID and a password via the operation unit 260 of the multifunction peripheral 111 or the user logs in by holding the user's ID card over the multifunction peripheral 111 can be employed.

The function execution instruction unit 352 acquires functions which are allowed to be executed by a general user who has logged in, and displays the acquired functions. Moreover, the function execution instruction unit 352 receives an instruction for executing the selected function from the general user. Thus, the function execution instruction unit 352 displays, from among the functions, such as printing and copying, of the multifunction peripheral 111, functions which are allowed to be executed by a general user, and receives an instruction for executing the selected function from the general user. Any function which is not allowed to be executed by a general user who has logged in is not displayed. The authority management unit 353 inquires of the DB 341 about functions which are allowed to be executed by a general user who has logged in and the allowable number of sheets for the general user, and acquires and determines information indicating whether to allow the general user to execute a function. Moreover, the authority management unit 353 passes a result of inquiry and determination to the function execution instruction unit 352. For example, the printing unit 354, the scanning unit 355, and the FAX unit 356 are configured to execute their respective functions. Although not illustrated, if the multifunction peripheral 111 is equipped with another function, a corresponding functional unit is also included in the multifunction peripheral 111.

Figure 4A:
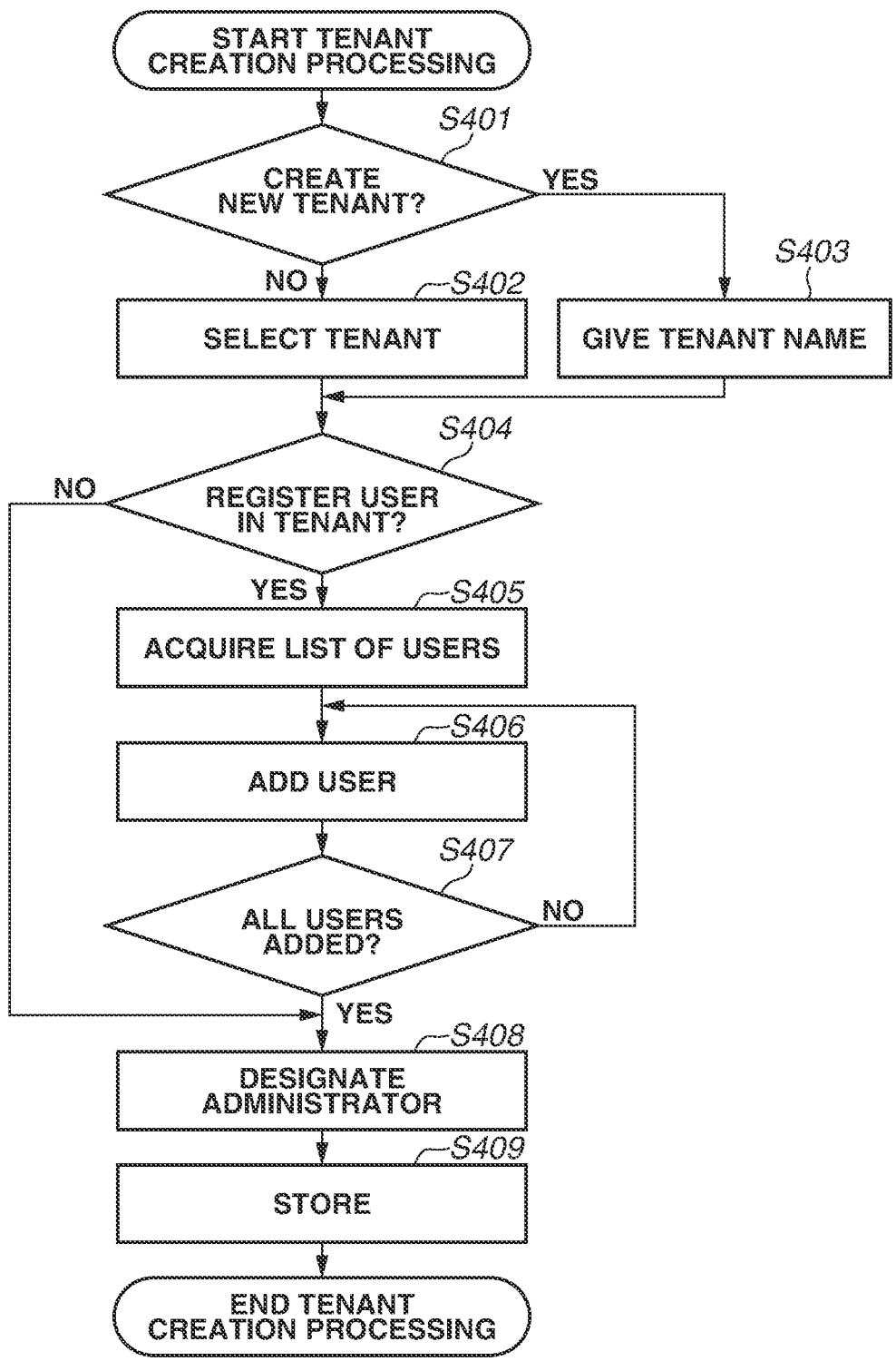
FIG. 4A is a flowchart of processing for a shared office administrator to create a tenant according to one or more aspects of the present disclosure.

Processing operations according to the first exemplary embodiment are described based on flowcharts and examples of user interfaces (UIs) with reference to FIGS. 4A to 4C to FIG. 12. FIG. 4A is a flowchart illustrating a flow of processing which the shared office administrator performs to create or change a tenant. Furthermore, while, in FIGS. 4A, 4B, and 4C, performing login processing in the terminal 101 in advance is necessary in any flow, the description thereof is omitted.

In step S401, the tenant creation unit 302 of the terminal 101 displays a tenant creation screen and receives an instruction as to whether to create a new tenant or perform an operation on an existing tenant from the shared office administrator. If the received instruction is not an instruction for creating a new tenant (NO in step S401), then in step S402, the tenant creation unit 302 displays a list of existing tenants and causes the shared office administrator to select a tenant. If the received instruction is an instruction for creating a new tenant (YES in step S401), then in step S403, the tenant creation unit 302 receives a tenant name from the shared office administrator.

Additionally, in step S404, the tenant creation unit 302 inquires of the shared office administrator whether to perform registration of not only a tenant administrator but also a general user with respect to the created or selected tenant. The user to be designated here is a user which has been created by a user creation flow illustrated in FIG. 4B. If registration of a general user is not to be performed (NO in step S404), then in step S408, the tenant creation unit 302 causes the shared office administrator to designate a tenant administrator, and, in step S409, stores a result of the processing and then ends the processing. If registration of a general user is to be performed (YES in step S404), then in step S405, the tenant creation unit 302 acquires and displays a list of general users which are able to be registered. Then, in step S406, the tenant creation unit 302 causes the shared office administrator to select and add a general user belonging to the tenant. If it is determined that all of the general users have been added (YES in step S407), then in step S408, the tenant creation unit 302 causes the shared office administrator to designate an administrator of the tenant, and, in step S409, stores a result of the processing and then ends the processing.

FIG. 4B is a flowchart illustrating a flow of processing which the shared office administrator performs to create a user. When instructed by the shared office administrator to create a user, in step S421, the user creation unit 303 display a user creation screen and receives inputting of a user name from the shared office administrator. Then, in step S422, the user creation unit 303 receives inputting of a password. Then, in step S423, the user creation unit 303 inquires of the shared office administrator whether to set a user to be created allowable to be designated as a tenant administrator. If a user to be created is set allowable to be designated as a tenant administrator, a user created with respect to any tenant becomes able to be set as a tenant administrator. If it is determined to set a user to be created allowable to be designated as a tenant administrator (YES in step S423), then in step S424, the user creation unit 303 gives an administrator authority to the created user, and, in step S425, stores a result of the processing and then ends the processing.

Furthermore, while it is conceivable that various processing operations, such as confirmatory inputting of a password, a password policy, and communication of a password using e-mail, accompany creation of a user, the description thereof is omitted. Moreover, a configuration in which the user creation unit 303 does not set whether to designate a user as an administrator at the time of creation of a user and, at the time of designating a user as a tenant administrator, gives an administrator authority to the user can be employed. Moreover, while, in the present exemplary embodiment, a method in which a user created in advance is registered as an administrator of the tenant is employed, a method in which an administrator is created in conformity with creation of a tenant can be employed.

Figure 5C:
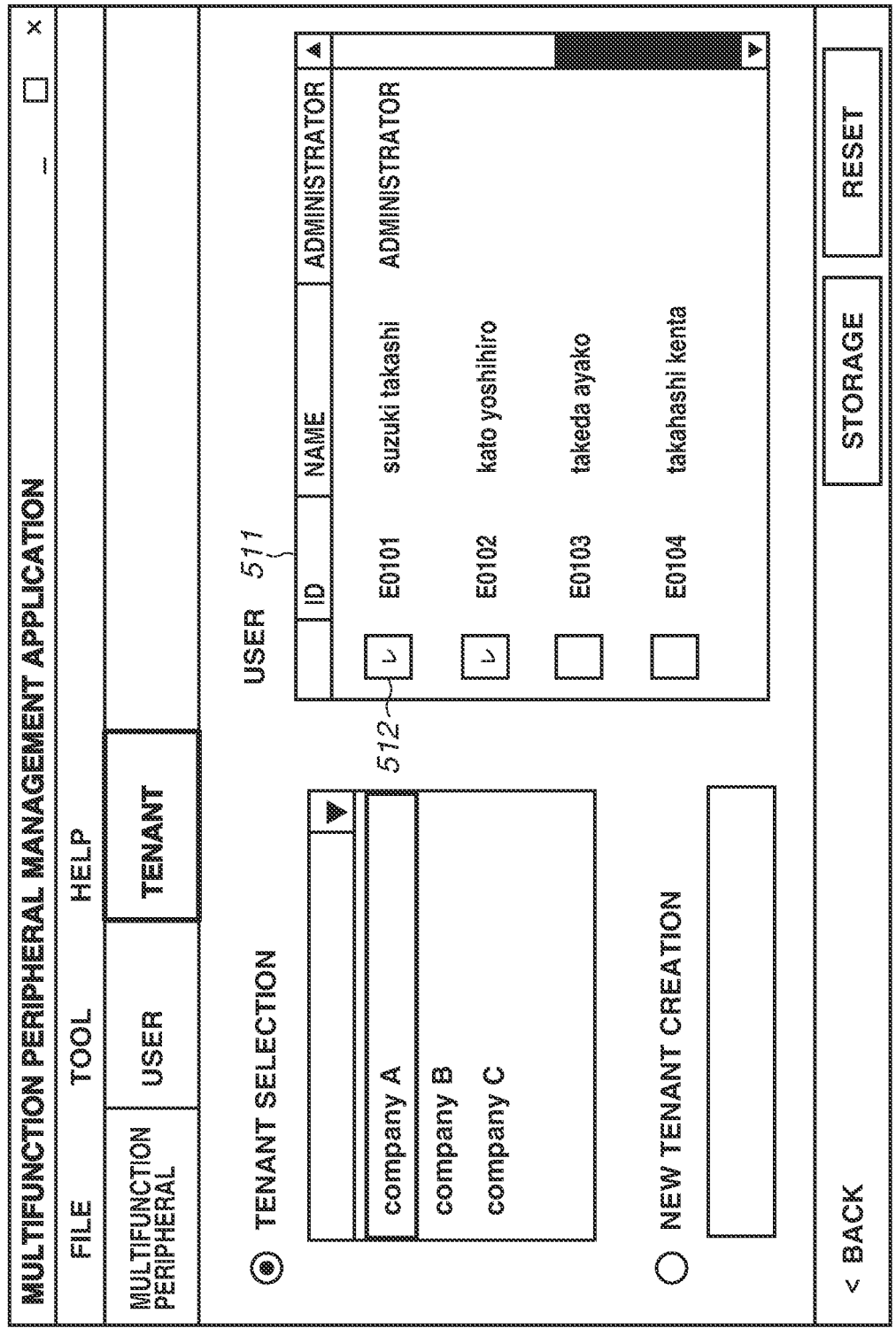
FIG. 5C illustrates an example of a UI via which to perform processing for the shared office administrator to create a tenant according to one or more aspects of the present disclosure.

FIGS. 5A, 5B, and 5C illustrate examples of UIs used for the shared office administrator to create a tenant. FIG. 5A illustrates a list screen showing a list of tenants, FIG. 5B illustrates a UI used to designate a tenant and an administrator thereof, and FIG. 5C illustrates a UI used to designate a user. Portions which are not directly relevant to the present exemplary embodiment are omitted from description.

The list screen is displayed on the entire UI 501 illustrated in FIG. 5A. A tab bar 502 includes buttons, and, when a button is pressed, a screen displayed in a region below the tab bar 502 is switched. In this example, a "tenant" button is in a state of being pressed. A list of tenants 503 shows information about tenants. A "tenant management" button 504 is operable to create a new tenant or change a tenant.

The UI illustrated in FIG. 5B is displayed in response to the "tenant management" button 504 being pressed. Radio buttons 505 are used to select whether to select an existing tenant or create a new tenant. In the case of selecting an existing tenant, the shared office administrator searches for tenants and selects a tenant from a list of displayed tenants via a combo box 506. In the case of creating a new tenant, the shared office administrator enters a tenant name into a text box 507. A combo box 508 is used to designate a tenant administrator. The tenant creation unit 302 searches for users already created and having an administrator authority and displays a list of the found users via the combo box 508. A search key can be a name, but can be a user ID. A link 509 is pressed when the shared office administrator also designates a general user belonging to the tenant. A "storage" button 510 is pressed to store the designated content.

FIG. 5C illustrates a UI used to designate a general user belonging to the tenant. The UI illustrated in FIG. 5C is displayed in response to the link 509 being pressed. A list box 511 is used to display a list of users which are able to be registered. In a case where the number of users is large, the list of users becomes able to be scrolled with a scrollbar. A checkbox 512 is used to select every user which is intended to be caused to belong to the designated tenant. A plurality of administrators can be registered or the number of administrators which are able to be registered can be limited to, for example, one.

Figure 5E:
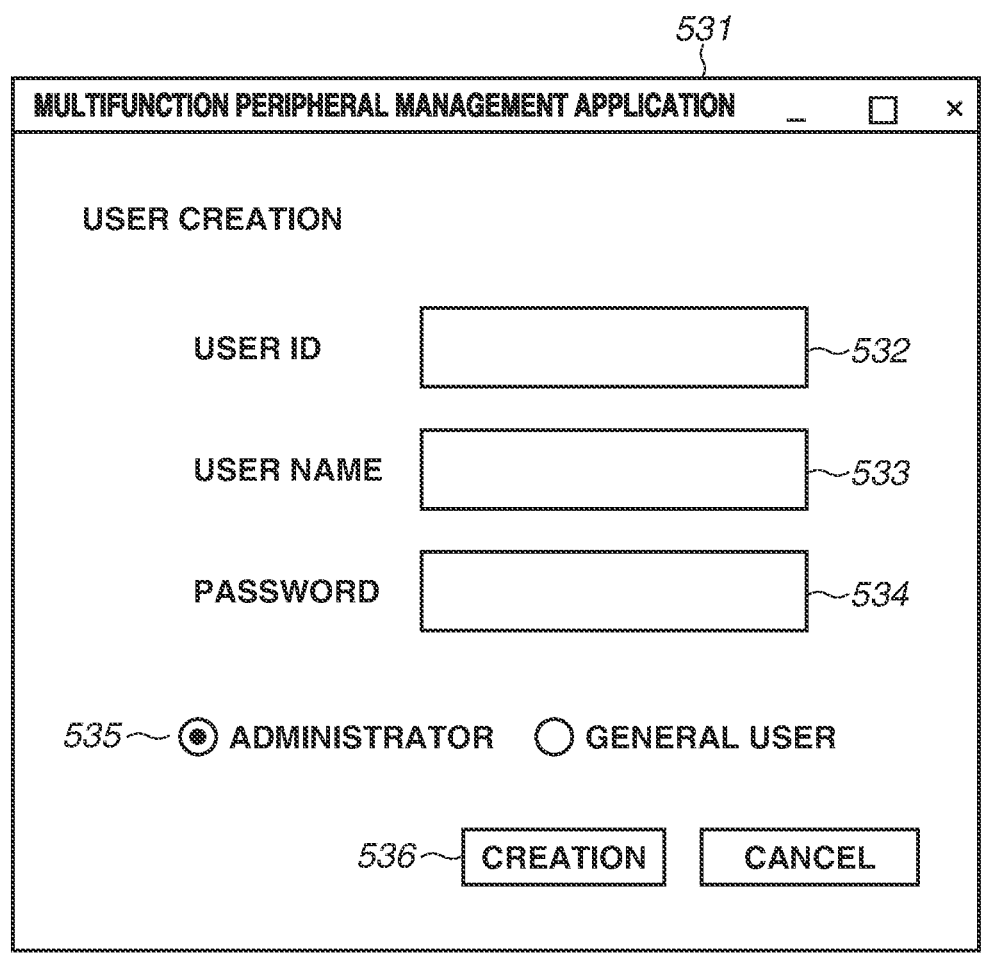
FIG. 5E illustrates an example of a UI via which to perform processing for the shared office administrator to create a user according to one or more aspects of the present disclosure.

FIGS. 5D and 5E illustrate examples of UIs used for the shared office administrator to create a user. A "user" button 521 in a tab bar illustrated in FIG. 5D is in a state of being pressed, and information about users is displayed in a region below the tab bar. A list box 522 shows a list of users. In the list box 522, for example, a user ID, a name, a tenant to which the user belongs, information indicating whether the user is an administrator, and the description of the user are displayed. A "user addition" button 523 is pressed when a user is intended to be added. A UI 531 is displayed in response to the "user addition" button 523 being pressed. A text box 532 is used to enter a user ID. A text box 533 is used to enter the name of a user. A text box 534 is used to enter the password of a user. Radio buttons 535 are used to designate whether a user to be created is an administrator or a general user. A "creation" button 536 is used to create a user with the designated content. Besides, a text box used to enter, for example, the description of a user can be included.

FIG. 4C is a flowchart illustrating a flow of processing which the shared office administrator in the terminal 101 performs to transfer, to a tenant administrator, an authority of setting a function which is allowed to be used in a multifunction peripheral. In step S431, the authority transfer setting unit 304 of the terminal 101 displays a list of multifunction peripherals present in the shared office and causes the shared office administrator to select a multifunction peripheral. Next, in step S432, the authority transfer setting unit 304 acquires and displays a list of image processing functions included in the selected multifunction peripheral. Then, in step S433, the authority transfer setting unit 304 causes the shared office administrator to select a tenant which is to be set as an authority transfer destination, and, in step S434, causes the shared office administrator to select a function which becomes able to be set by the administrator of the selected tenant. After causing the shared office administrator to select a function, in step S435, the authority transfer setting unit 304 causes the shared office administrator to perform settings with respect to the selected function and checks whether there is any operation performed on an unset function. After completion of the checking (NO in step S435), in step S436, the authority transfer setting unit 304 stores the set content. Thus, an authority of setting whether to allow the selected function of the multifunction peripheral to be used and performing function restriction is given to the administrator of the selected tenant.

Repeating processing in step S433 to step S436 enables transferring an authority to a plurality of tenants. Moreover, repeating processing in step S431 to step S437 enables performing processing for authority transfer to a plurality of multifunction peripherals. If settings to the required tenants have been completed (NO in step S437) and settings to the required multifunction peripherals have been completed (NO in step S438), the authority transfer setting unit 304 ends the processing.

Figure 5G:
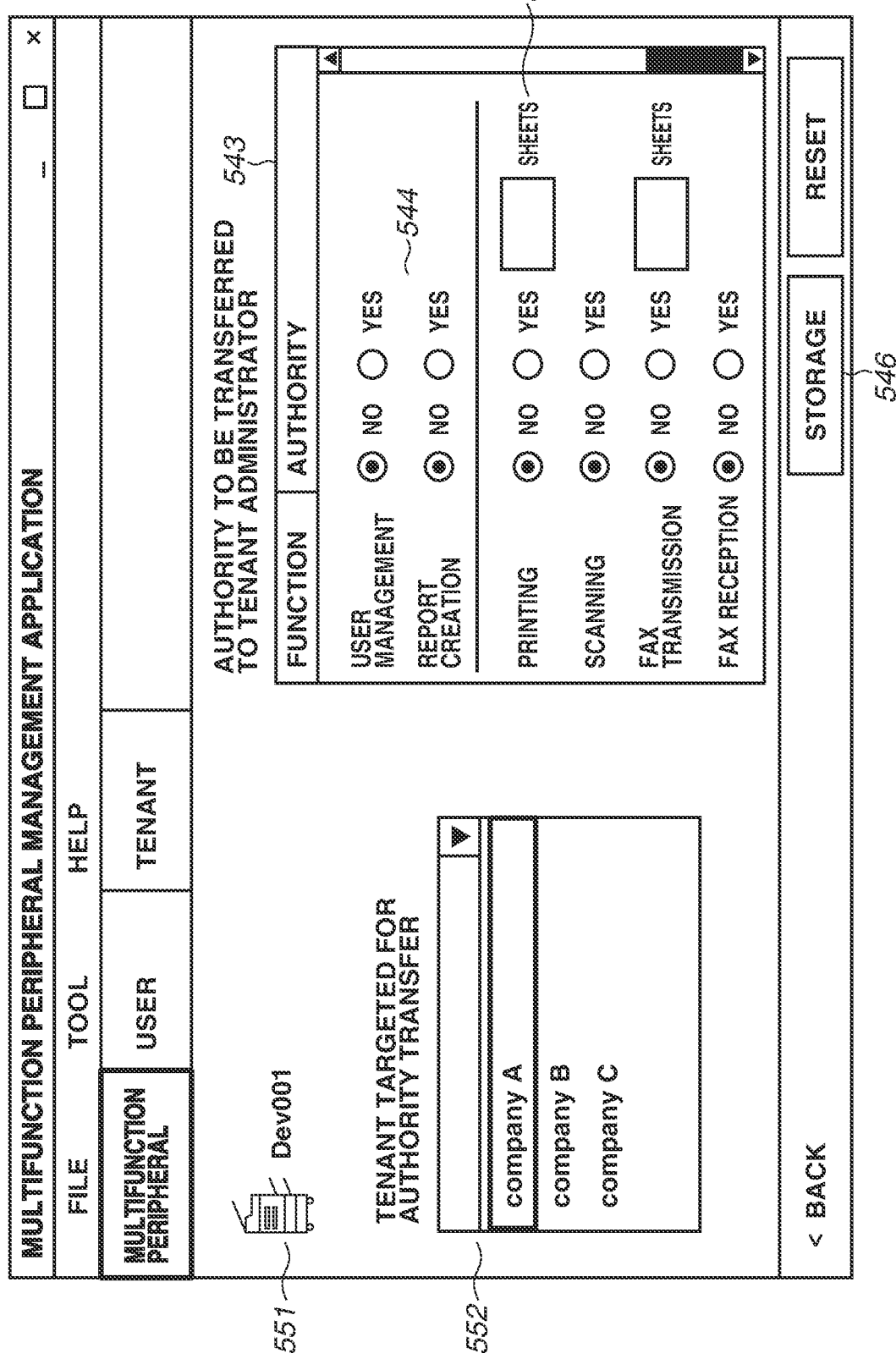
FIG. 5G illustrates an example of a UI via which to perform processing for the shared office administrator to transfer an authority to a tenant administrator according to one or more aspects of the present disclosure.

FIGS. 5F and 5G illustrate examples of UIs used for the shared office administrator to transfer, to a tenant administrator, an authority of setting a function which is allowed to be used in the multifunction peripheral. A "multifunction peripheral" button 541 in a tab bar illustrated in FIG. 5F is in a state of being pressed. When the "multifunction peripheral" button 541 is pressed, a list of multifunction peripherals is displayed together with information thereabout below the tab bar. A field 542 indicates a state in which a multifunction peripheral "Dev001" has been selected. When, in this state, an "authority setting" button 543 is pressed, the UI transitions to a setting screen (FIG. 5G) for authority transfer to the selected multifunction peripheral.

An icon 551 illustrated in FIG. 5G indicates the multifunction peripheral "Dev001" being selected. A combo box 552 is used to designate a tenant which is targeted for authority transfer. A list box 543 displays a list of functions which are able to be set by the administrator of the selected tenant. The list of functions include individual functions. With regard to, for example, printing and scanning, whether the tenant administrator is able to set whether to allow a general user to use the respective functions is set. Radio buttons are used to set whether to allow usage of the respective functions. In a case where the authority has been set to "yes", the tenant administrator becomes able to set whether to allow a general user to use the corresponding function. Besides, with regard to administrator-oriented functions, such as user management and report creation, which the tenant administrator executes, settings are made available. With regard to these administrator-oriented functions, whether the tenant administrator is allowed to execute such functions is set.

Moreover, a box 545 is used for the shared office administrator to designate the upper limit of the number of sheets which are allowed to be used by each tenant. The upper limit in the tenant about the applicable function is designated with a numerical value. If there is no setting, the tenant becomes able to use the function without limitation. A "storage" button 546 is used to store the designated content. For example, according to the content of the contract with each tenant, the shared office administrator is able to limit the number of sheets which are allowed to be used by the tenant within a specific period or allow the tenant to use sheets without limitation.

Furthermore, while processing which the shared office administrator performs, using the functions of the terminal 101, to transfer an authority of setting a function which is allowed to be used to the tenant administrator has been described, the multifunction peripheral 111 can be configured to perform such processing. In that case, the functions of the terminal 101 illustrated in FIG. 3 are configured to be included in the multifunction peripheral 111. In a case where the multifunction peripheral 111 includes these functions, the terminal 101 is equipped with a web browser to use functions of the multifunction peripheral 111, as with processing in which the terminal 102 or 103 sets a function which is allowed to be used to a general user as described below.

FIG. 6 is a flowchart illustrating a flow of processing for causing the tenant administrator in the terminal 102 or 103 to set a function which is allowed to be used to a general user. In step S601, the remote login unit 335 of the multifunction peripheral 111 displays a page for login by the Uniform Resource Locator (URL) thereof being designated on the web browser 311 by the tenant administrator, and receives login from the tenant administrator. Since designating the URL means designating a multifunction peripheral, the remote login unit 335 displays a web page provided by the remote UI unit 334 of the multifunction peripheral 111. Login is performed by receiving a user ID and a password.

In step S602, the authority setting unit 336 acquires a list of functions which are allowed to be set in the tenant of the tenant administrator and displays the acquired list of functions. The list of functions to be described here corresponds to the functions selected in step S434 illustrated in FIG. 4C, which are, as a result, functions the authorities for which are admitted in Table 3. Additionally, in step S603, the authority setting unit 336 causes the tenant administrator to select a target to which to set an authority. The target to which to set an authority is a general user or the entire tenant. The user to be designated here is a user created in advance by the tenant administrator or the shared office administrator. While a flow in which a user is created by the tenant administrator is almost the same as the flow illustrated in FIG. 4B, it is impossible to set the user as an administrator as in step S424.

In a case where different settings are performed on both a general user and the entire tenant in the same function, in the present exemplary embodiment, if any one of a general user and the entire tenant is set to impossibility of execution of the function, it is determined that execution of the function is impossible. However, the present exemplary embodiment is not necessarily limited to such a determination, and, if at least one of a general user and the entire tenant is set to possibility of execution of the function, it can be determined that execution of the function is possible.

Next, in step S604, the authority setting unit 336 sets whether a target selected for an individual function is allowed to execute the function. If it is possible to designate the number of sheets as an upper limit depending on the function (YES in step S605), then in step S606, the authority setting unit 336 can cause the tenant administrator to set the number of sheets. Then, in step S607, the authority setting unit 336 determines whether the upper limit value falls within the maximum number of sheets set to the entire tenant. If it is determined that the upper limit value exceeds the maximum number of sheets (NO in step S607), the authority setting unit 336 prompts the tenant administrator to reenter an upper limit value. If all of the functions have been set (NO in step S608), then in step S609, the authority setting unit 336 stores the set content. Furthermore, if it is impossible to set the number of sheets depending on the function (NO in step S605), the authority setting unit 336 does not perform steps S606 to S607. If, after repeating processing in steps S603 to S609, the authority setting unit 336 has performed settings of usable functions on all of the required targets (NO in step S610), the authority setting unit 336 ends the processing.

FIG. 7A illustrates an example of a UI used for the tenant administrator to perform login on the web browser 311. A screen 701 is displayed on the web browser 311. A designated URL is entered into a field 702. This URL specifies a multifunction peripheral. A multifunction peripheral management UI 703 is a UI for login. Text boxes 704 and 705 are used to enter a user ID and a password, respectively, therein. A button 706 is a "login" button.

Figure 7B:
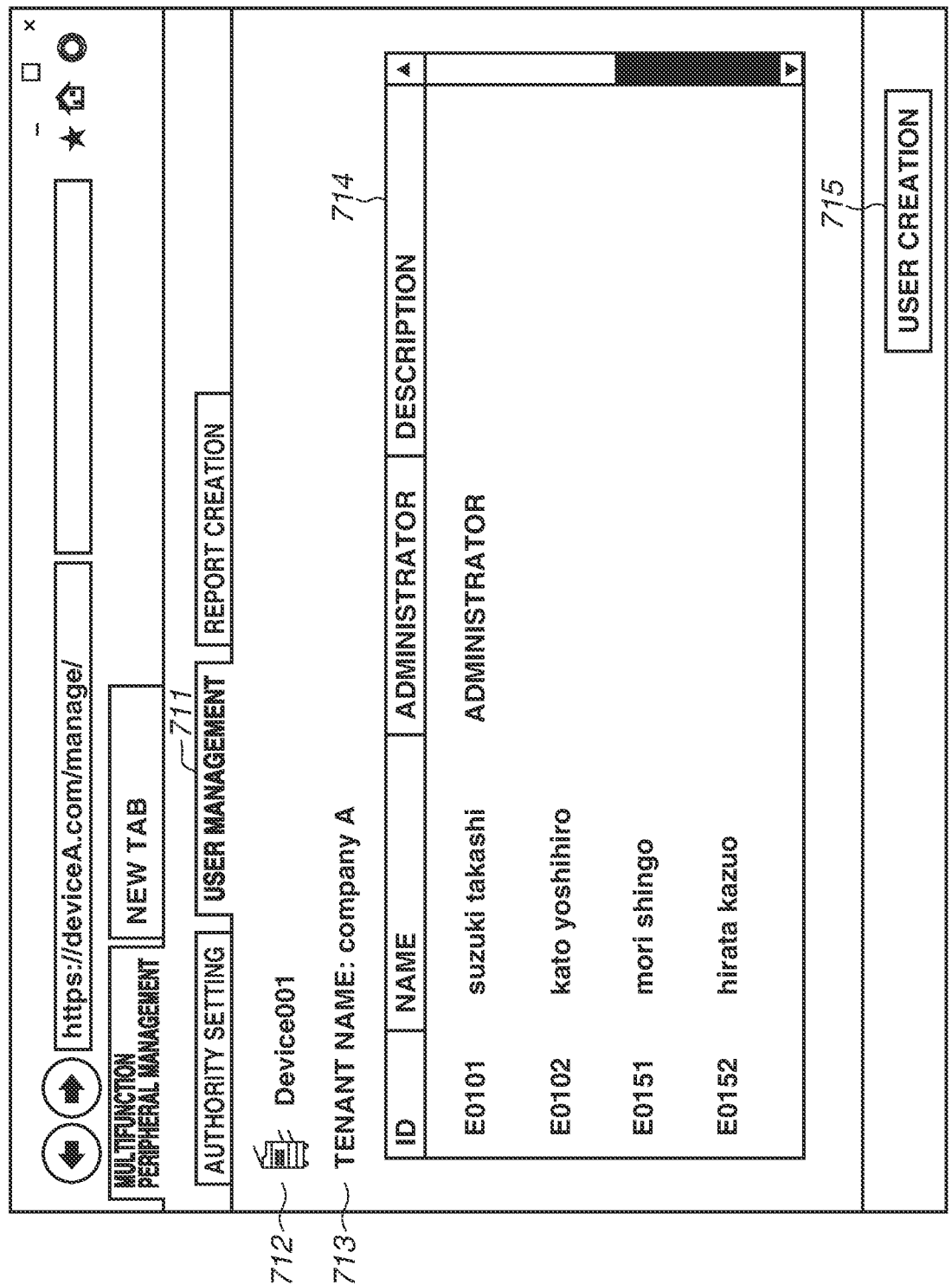
FIG. 7B illustrates an example of a UI via which to perform processing for the tenant administrator to set whether to allow a general user to use a function of the multifunction peripheral according to one or more aspects of the present disclosure.

FIGS. 7B and 7C illustrate examples of UIs used to create a general user. Tab buttons 711 illustrated in FIG. 7B include a "user management" tab, which is in a state of being selected. An icon 712 indicates a multifunction peripheral to which login has been performed. A field 713 indicates a tenant which the tenant administrator belongs to and manages. A list box 714 indicates a list of users. A button 715 is a "user creation" button. FIG. 7C illustrates an example of a UI used to enter information about a user, and the UI illustrated in FIG. 7C is displayed in response to the "user creation" button 715 illustrated in FIG. 7B being pressed. Text boxes 721, 722, and 723 are used to enter a user ID, a user name, and a password, respectively, therein. A "creation" button 724 is used to create a user with the designated content.

Figure 7D:
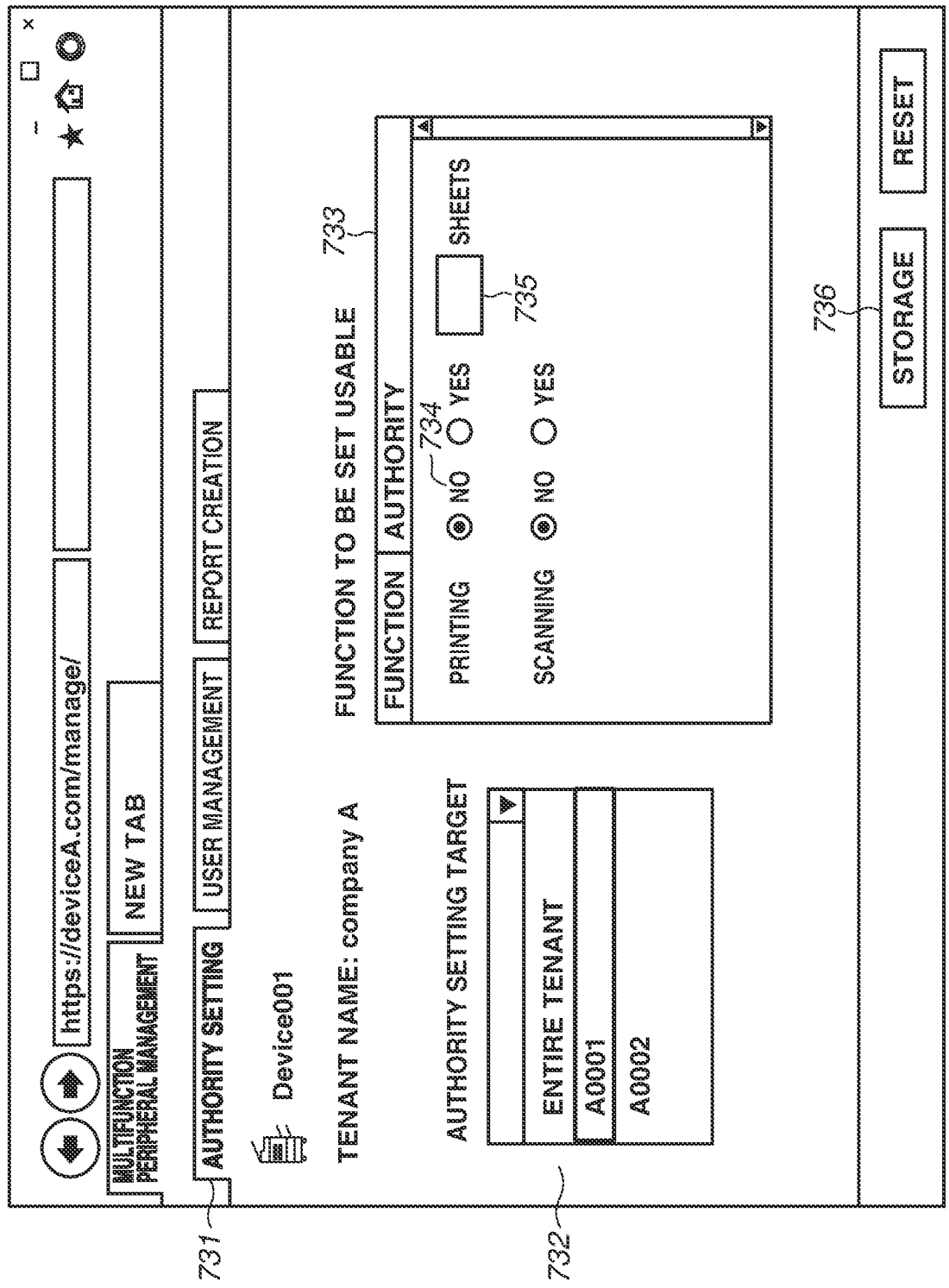
FIG. 7D illustrates an example of a UI via which to perform processing for the tenant administrator to set whether to allow a general user to use a function of the multifunction peripheral according to one or more aspects of the present disclosure.

FIG. 7D illustrates an example of a UI used to set possibility or impossibility of execution of each function and the upper limit value of the number of sheets allowed to be used with respect to a user or the entire tenant. An "authority setting" tab 731 is in a state of being selected. A combo box 732 is used to select an authority setting target. The combo box 732 enables selecting not only a general user but also the entire tenant. A list box 733 indicates a list of functions to which to set possibility or impossibility of execution. Radio buttons 734 are used to set possibility or impossibility of execution of each function. A box 735 is used to designate the upper limit of the number of sheets. Although not illustrated, the number of sheets allowed to be used by the entire tenant can be displayed in such a way as to be understandable on a function-by-function basis. A "storage" button 736 is used to store the designated content.

Figure 8:
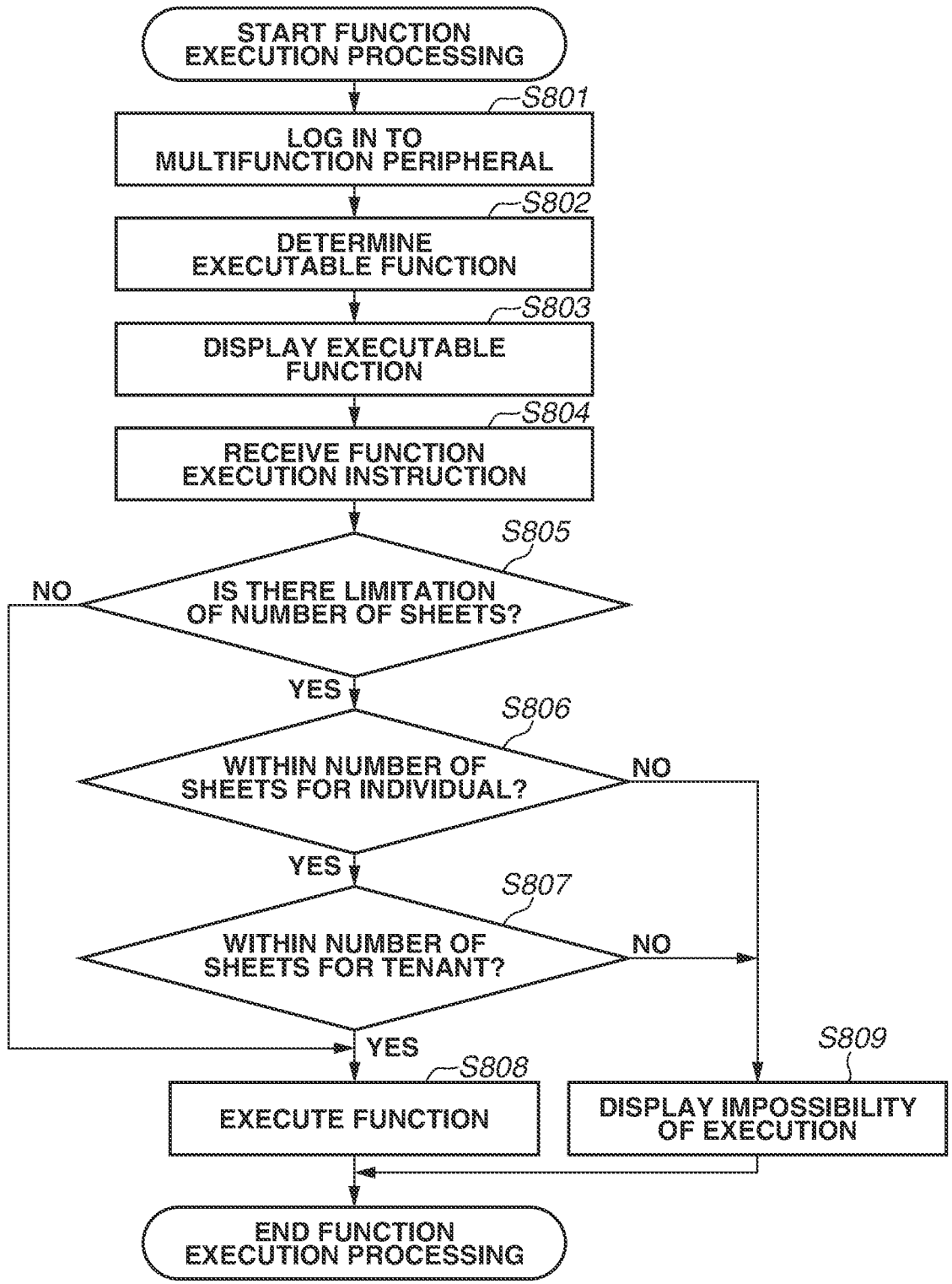
FIG. 8 is a flowchart of processing for the general user to perform a function of the multifunction peripheral according to one or more aspects of the present disclosure.

FIG. 8 is a flowchart illustrating a flow of processing for a general user to execute, in the multifunction peripheral 111, a function of the multifunction peripheral 111. Furthermore, with regard to a flow for a general user to issue an instruction for, for example, printing with use of any one of the terminals 104 to 109, since there is no processing characterized in the present exemplary embodiment, the description of such a flow is omitted. It is assumed that a print job is previously present in the function instruction receiving unit 333.

In step S801, the local login unit 351 receives login from a general user. Additionally, in step S802, the authority management unit 353 checks the authority of the logged-in general user and passes information about the checked authority to the function execution instruction unit 352, and, in step S803, the function execution instruction unit 352 displays a list of functions which are allowed to be used by the logged-in general user. Then, in step S804, the function execution instruction unit 352 receives, from the general user, a function execution instruction for, for example, printing. Additionally, in step S805, the function execution instruction unit 352 inquires of the authority management unit 353 whether the function targeted for the function execution instruction is a function in which the upper limit value of the number of sheets allowed to be used is set. If there is no limitation of the number of sheets (NO in step S805), then in step S808, the applicable functional unit, such as the printing unit 354, directly performs processing for the function.

If there is a setting of the upper limit value of the number of sheets (YES in step S805), then in step S806, the authority management unit 353 acquires the upper limit value for the general user, who intends to execute the function, from the user number-of-sheets management table shown in Table 5, and checks whether the current execution leads to the upper limit value of the number of sheets being exceeded. If the upper limit value of the number of sheets is not exceeded (YES in step S806) then in step S807, the authority management unit 353 acquires the upper limit value for the tenant from the tenant number-of-sheets management table shown in Table 6, and checks whether the current execution leads to the upper limit value for the entire tenant being exceeded. If at least one of the upper limit value of the number of sheets for the general user and the upper limit value for the entire tenant is exceeded (NO in step S806 or NO in step S807), then in step S809, the applicable functional unit informs the general user that, since the limitation of the number of sheets is exceed, the function is not allowed to be executed, by, for example, displaying such an effect. If not so (YES in step S806 and YES in step S807), then in step S808, the applicable functional unit executes the function. Furthermore, in a case where there is a designation of only the number of sheets for an individual or in a case where there is a designation of only the number of sheets for the tenant, it is assumed that the function is processed with the number of sheets deemed to be within the allowable range. Besides, since there is no limitation to the order of determinations in steps S806 and S807, an order in which the range of the number of sheets for the tenant is first determined can be employed.

Furthermore, instead of making the processing not allowed to be executed in all of the cases where the number of sheets is exceeded, a configuration of making the processing allowed to be executed up to an allowed number of sheets can be employed. Moreover, with regard to functions in which any one of the terminals 104 to 109 issues an execution instruction, such as a printing function, a configuration in which, before an operation is performed on the multifunction peripheral 111, impossibility of execution of the function is displayed by any one of the terminals 104 to 109 can be employed. Moreover, in displaying of the impossibility of execution in step S809, the detailed reason therefor, such as the range of the number of sheets for an individual being exceeded or the range of the number of sheets for the tenant being exceeded, can be displayed.

Figure 9:
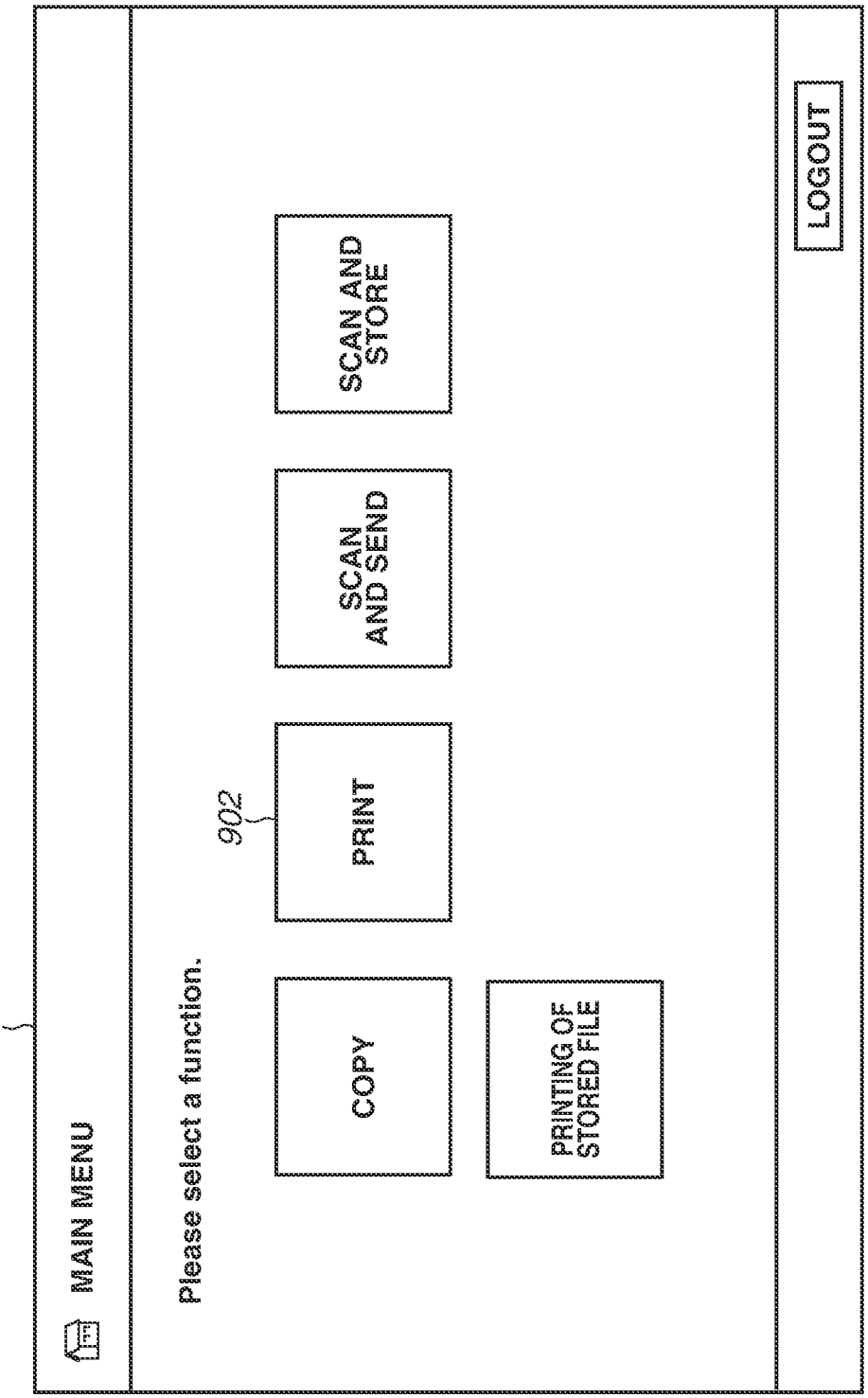
FIG. 9 illustrates an example of a UI via which to perform processing for the general user to perform a function of the multifunction peripheral according to one or more aspects of the present disclosure.

FIG. 9 illustrates an example of a UI used for a general user to select a function which the general user executes after logging in to the multifunction peripheral 111. A main menu 901 is the entire UI. Each icon 902 is an icon indicating a function which is allowed to be used by the logged-in general user. With regard to a function which is not allowed to be used, no icon is displayed. Moreover, with regard to a function which is not allowed to be used due to the limitation of the number of sheets being exceeded, a method of, for example, displaying an icon in a lighter color (grayed out) or performing discriminatory display, at the side of an icon, for getting the user to recognize that the function is not allowed to be used due to the limitation of the number of sheets being exceeded is conceivable.

Figure 10:
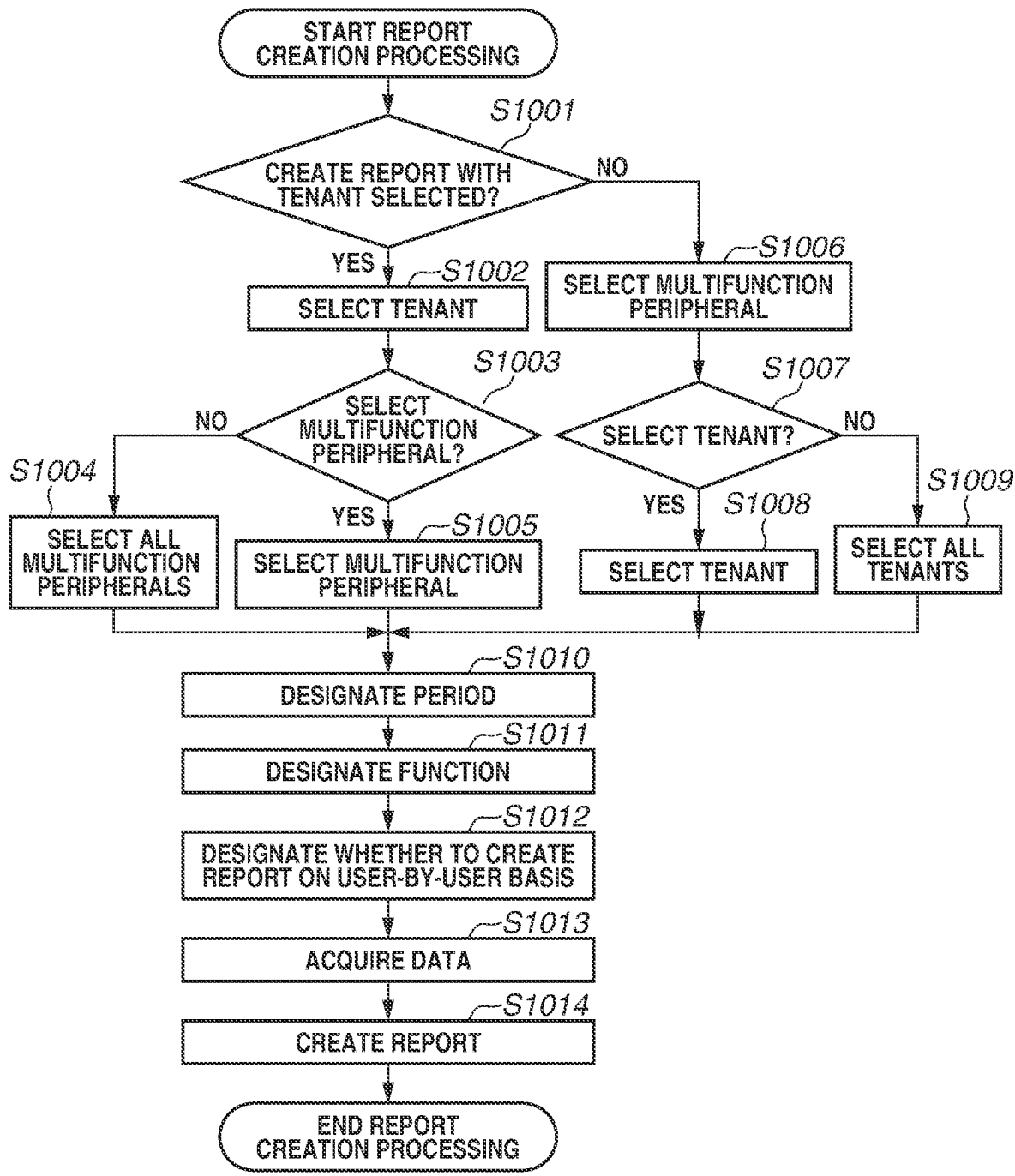
FIG. 10 is a flowchart of processing for the shared office administrator to create a report of the number of used sheets according to one or more aspects of the present disclosure.

FIG. 10 is a flowchart illustrating a flow of processing for the shared office administrator to create, in the terminal 101, a report about the number of print sheets which were used. In step S1001, the report creation unit 305 of the terminal 101 inquires of the shared office administrator whether to create a report with a tenant designated or create a report with a multifunction peripheral designated. If it is determined to create a report with a tenant designated (YES in step S1001), then in step S1002, the report creation unit 305 receives designation of a tenant.

Then, in step S1003, the report creation unit 305 of the terminal 101 inquires of the shared office administrator whether to perform narrowing-down by further designating a multifunction peripheral. If it is determined not to perform narrowing-down (NO in step S1003), then in step S1004, the report creation unit 305 targets (selects) all of the multifunction peripherals. If it is determined to perform narrowing-down (YES in step S1003), then in step S1005, the report creation unit 305 receives selection of a multifunction peripheral. If it is determined to create a report with a multifunction peripheral designated (NO in step S1001), then in step S1006, the report creation unit 305 receives designation of a multifunction peripheral. Then, in step S1007, the report creation unit 305 inquires of the shared office administrator whether to perform narrowing-down by further designating a tenant. If it is determined not to perform narrowing-down (NO in step S1007), then in step S1009, the report creation unit 305 selects all of the tenants. If it is determined to perform narrowing-down (YES in step S1007), then in step S1008, the report creation unit 305 receives selection of a tenant.

Then, in step S1010, the report creation unit 305 inquires of the shared office administrator about a period targeted for creating a report. Then, in step S1011, the report creation unit 305 inquires of the shared office administrator about a function of the multifunction peripheral with respect to which to create a report. All of the functions of the multifunction peripheral can be designated as targets for creating a report. Additionally, in step S1012, the report creation unit 305 inquires of the shared office administrator whether to create a report on a user-by-user basis. If it is determined not to create a report on a user-by-user basis, a report is output on a tenant-by-tenant basis or on a multifunction peripheral-by-multifunction peripheral basis. Then, in step S1013, the report creation unit 305 inquires of the multifunction peripheral and acquires information about the number of sheets. In the case of creating a report about all of the multifunction peripherals on a tenant-by-tenant basis, the report creation unit 305 acquires information about the number of sheets from all of the multifunction peripherals. Finally, in step S1014, the report creation unit 305 creates a report based on the acquired information. The created report can be displayed on a screen or can be output as a file in the format of, for example, comma-separated values (CSV).

Furthermore, a configuration in which the tenant administrator is able to perform creation of a report in the terminal 102 or 103 can be employed. In that case, while the tenant administrator is not able to create a report about other than the tenant which the tenant administrator manages, the flow of processing other than that is the same as the flow illustrated in FIG. 10. Assuming that the report creation unit 305 is configured to be included in the multifunction peripheral 111, the tenant administrator accesses the multifunction peripheral 111 via the web browser 311 and the report creation unit 305 performs acquisition of a request for report creation and a response on a web base in a way similar to that of the flow illustrated in FIG. 6 and outputs a report. The terminal 101 can also be configured to access the multifunction peripheral 111 with use of a web browser and perform acquisition of a request for report creation and a response on a web base.

FIGS. 11A and 11B illustrate examples of UIs used for the shared office administrator to create a report about the number of used sheets. FIG. 11A illustrates a UI used for creation on a multifunction peripheral-by-multifunction peripheral basis, and FIG. 11B illustrates a UI used for creation on a tenant-by-tenant basis. A UI 1101 illustrated in FIG. 11A is a UI which operates on the terminal 101 and which is operated by the shared office administrator as with those illustrated in FIGS. 5A, 5B, 5C, 5D, 5E, 5F, and 5G.

A tab bar 1102 includes a "multifunction peripheral" button, which is in a state of being pressed in FIG. 11A. A UI used to create a report on a multifunction peripheral-by-multifunction peripheral basis is displayed in a region below the tab bar 1102. An icon 1103 indicates a multifunction peripheral "Dev001" having been selected. A text box 1104 is used to designate a period targeted for creating a report. The text box 1104 can be configured to allow, for example, dates to be freely entered or can be configured to display a calendar to enable selecting dates. A pull-down menu 1105 is used to designate a target tenant. In the pull-down menu 1105, an item "all" which indicates all of the tenants is also able to be selected. A pull-down menu 1106 is used to designate a function such as printing or FAX. In the pull-down menu 1106, an item "all" which indicates all of the functions is also able to be selected. Radio buttons 1107 are used to designate whether to output a report on a user-by-user basis. A button 1108 is a "creation" button, which is used to, when being pressed, issue an instruction for creating a report. Furthermore, a UI in which a plurality of target tenants or target functions is able to be selected via, for example, a checkbox can be employed.

With regard to FIG. 11B, only portions different from those illustrated in FIG. 11A are described. A tab bar 1111 includes a "tenant" button, which is in a state of being pressed in FIG. 11B, and a UI used to create a report on a tenant-by-tenant basis is displayed in a region below the tab bar 1111. An icon 1112 indicates a state in which "company A" has been selected. A pull-down menu 1113 is used to designate a target multifunction peripheral. In the pull-down menu 1113, an item "all" which indicates all of the multi-function peripherals is able to be selected.

FIGS. 11C and 11D illustrate examples of created reports. The content indicated by each of the examples can be displayed as a UI on the terminal 101 or can be generated as a file. An example 1121 illustrated in FIG. 11C is an example of a report created on a user-by-user basis. A field 1122 indicates a period. A list 1123 is a report about the number of sheets which were used for each user. Company A is designated as a tenant, and printing and FAX are designated as functions. A field 1124 indicates the total number of sheets as a whole. An example 1131 illustrated in FIG. 11D is an example of a report created not on a user-by-user basis but on a tenant-by-tenant basis and with a multifunction peripheral designated. A content 1132 of the report indicates only the total number of sheets as an output.

Figure 12:
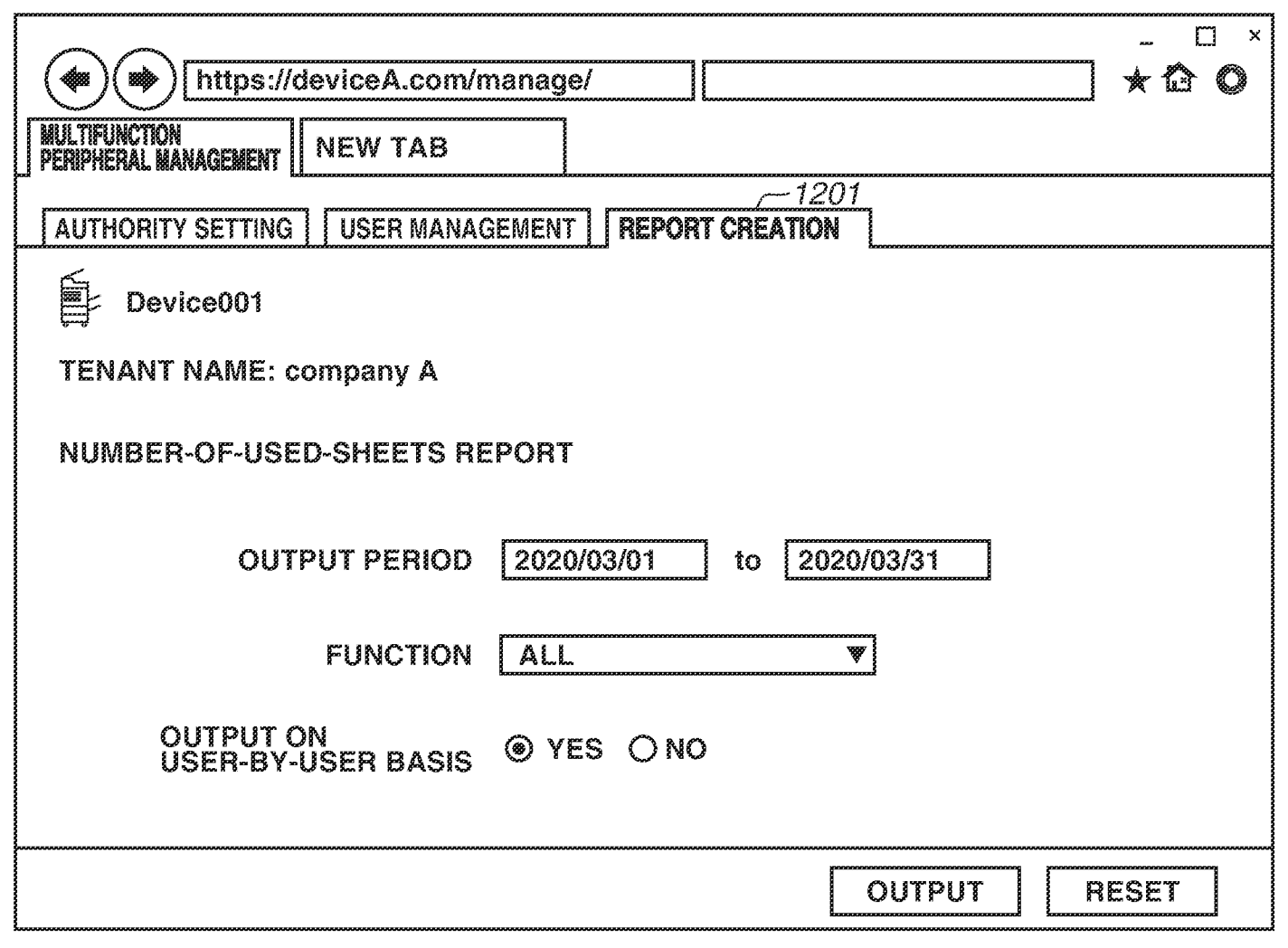

Furthermore, the tenant administrator is also able to perform creation of a report only with respect to the tenant to which the tenant administrator belongs. FIG. 12 illustrates an example of a UI used for the tenant administrator to create a report. In a UI which is used by the tenant administrator, a tab bar 1201 includes a "report creation" tab, which is in a state of being pressed in FIG. 12, and a designation content regarding the report creation is displayed below the tab bar 1201. The designation content is the same as that illustrated in FIG. 11A or 11B except that a portion for designating a tenant is not present.

As described above, according to the first exemplary embodiment, transferring an authority of setting a function of a multifunction peripheral which is allowed to be used by a general user from a shared office administrator to a tenant administrator enables the tenant administrator to perform such setting. This makes it unnecessary for the shared office administrator to perform function settings on users of all of the tenants.

Next, a second exemplary embodiment of the present disclosure is described with reference to the drawings. Furthermore, portions which are in common with those in the first exemplary embodiment are omitted from description, and, in the following description, only different portions are described.

As mentioned above in the first exemplary embodiment, the shared office administrator is able to set, with respect to a tenant, the upper limit of the number of usable sheets depending on functions. Since, when the upper limit has been reached, the tenant becomes unable to use the function any more, in a circumstance in which it is inevitably impossible to reduce the number of used sheets and the upper limit value may be reached, a method in which the tenant administrator requests the shared office administrator to raise the upper limit is demanded. Although making such a request in writing or via e-mail is conceivable, in view of the fact that it takes a lot of trouble, the second exemplary embodiment is directed to systematically solving this issue.

Figure 13:
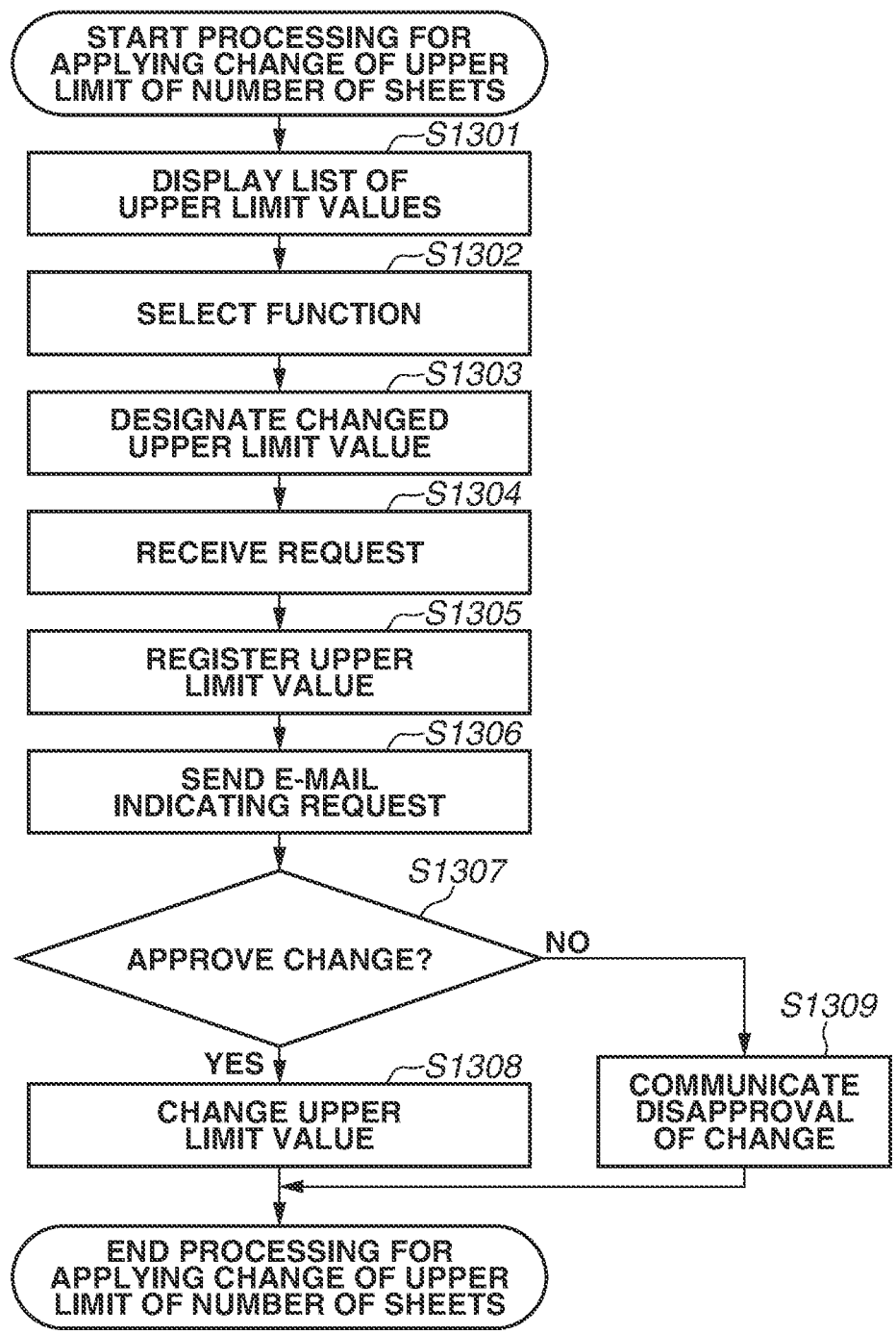
FIG. 13 is a flowchart of processing for requesting a change of the upper limit value of the number of usable sheets according to one or more aspects of the present disclosure.

FIG. 13 is a flowchart illustrating a flow of processing for the tenant administrator to, via the client 102 or 103, make a request for changing the upper limit of the number of usable sheets according to the second exemplary embodiment. In step S1301, the authority setting unit 336 of the multifunction peripheral 111 displays a list of upper limit values for the respective functions on the web browser 311 of the terminal 102 or 103. Then, in step S1302, the authority setting unit 336 receives, from the tenant administrator, selection of a function for which to change the upper limit value. Additionally, in step S1303, the authority setting unit 336 receives, from the tenant administrator, designation of a changed upper limit value (a value to which to change the upper limit value), and, in step S1304, receives the request as an application. Then, in step S1305, in response to the received request, the authority setting unit 336 registers the changed upper limit value designated by the tenant administrator with the DB 341 of the multifunction peripheral 111.

In step S1306, an e-mail transmission unit 1401 of the multifunction peripheral 111 sends, to the shared office administrator, an e-mail indicating that changing of the upper limit value has been requested. If it is determined that changing of the upper limit value has been approved by the shared office administrator having received the e-mail (YES in step S1307), then in step S1308, the authority transfer setting unit 304 of the terminal 101 sets, to the DB 341 of the multifunction peripheral 111, the changed upper limit value designated and requested by the tenant administrator as a new upper limit value. If it is determined that changing of the upper limit value has been disapproved by the shared office administrator (NO in step S1307), then in step S1309, the e-mail transmission unit 1401 of the multifunction peripheral 111 communicates disapproval of changing of the upper limit value to the tenant administrator. Furthermore, the method of communicating a request for changing of the upper limit value from the tenant administrator to the shared office administrator is not limited to an e-mail. A method of communicating the request from the terminal 102 or 103 to the terminal 101 without via the multifunction peripheral 111 can also be employed.

Figure 14:
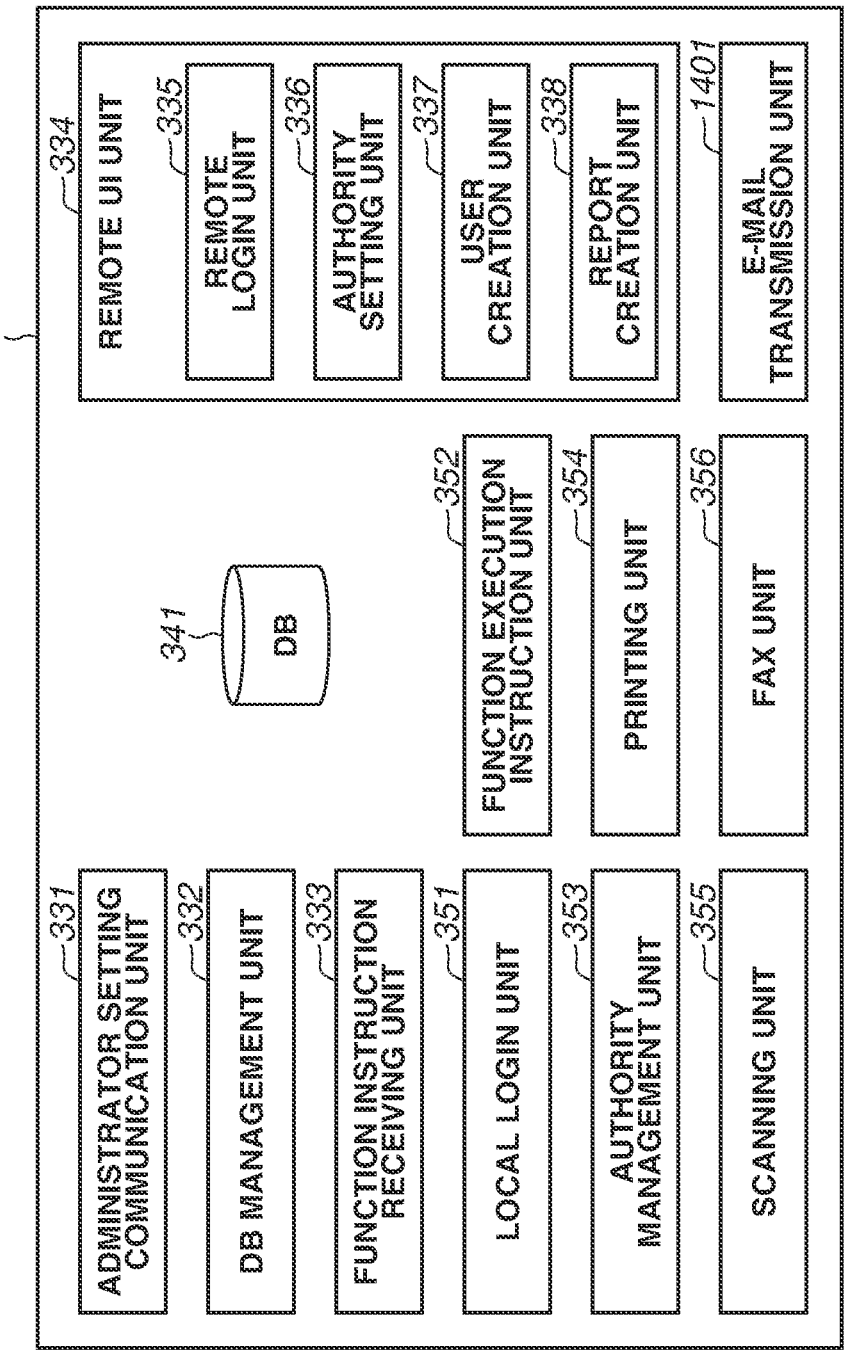
FIG. 14 is a diagram illustrating functional blocks of software of a multifunction peripheral according to one or more aspects of the present disclosure.

FIG. 14 is a diagram illustrating functional blocks of the multifunction peripheral 111 according to the second exemplary embodiment. The e-mail transmission unit 1401 is additionally included in the multifunction peripheral 111 as compared with the configuration illustrated in FIG. 3. The e-mail transmission unit 1401 is a processing unit including the function of sending an e-mail, and, in the second exemplary embodiment, upon receiving a request for changing of the upper limit value from the tenant administrator, communicates the received request to the shared office administrator.

Figure 15A:
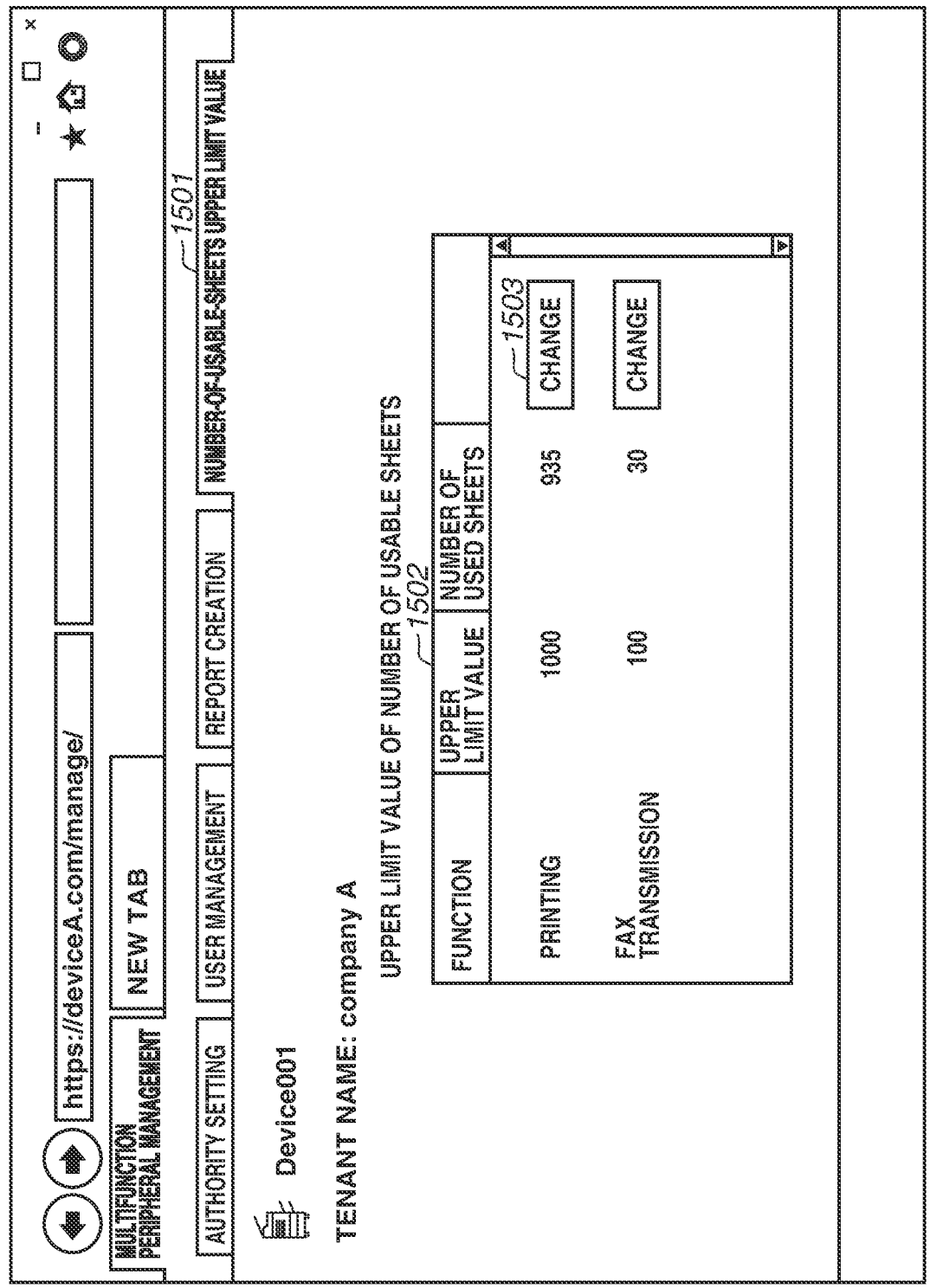
FIG. 15A illustrates an example of a UI via which to perform processing for requesting a change of the upper limit value of the number of usable sheets according to one or more aspects of the present disclosure.

FIGS. 15A and 15B illustrate examples of UIs used for the tenant administrator to make a request for changing the upper limit value of the number of usable sheets. Each of the UIs illustrated in FIGS. 15A and 15B operates on the web browser 311 as with the UIs illustrated in FIGS. 7A, 7B, 7C, and 7D. A tab button 1501 illustrated in FIG. 15A is used to display a list screen for a list of upper limit values of the number of usable sheets. In the list 1502 of upper limit values, the upper limit value and the current number of used sheets are displayed for each function. A button 1503 is a button which the tenant administrator presses when intending to change the upper limit value. A dialog 1511 illustrated in FIG. 15B is displayed in response to the button 1503 being pressed. In the dialog 1511, the current upper limit value for a function to be changed is displayed. A text box 1512 is used to set a changed upper limit value (a value to which to change the upper limit value). An "application" button 1513 is a button which the tenant administrator presses when making a request for changing the upper limit value with a value entered into the text box 1512.

As described above, according to the second exemplary embodiment, the tenant administrator is able to apply for changing of the upper limit value of the number of usable sheets to the shared office administrator via a system.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-098733 filed Jun. 5, 2020, which is hereby incorporated by reference herein in its entirety.

What is claimed is:

1. An image processing apparatus having an image processing function including a print processing function and configured to allow an authenticated user to use the image processing function, the image processing apparatus comprising:
   at least one first processor and at least one first memory coupled to the first processor and having stored thereon instructions that, when executed by the first processor, cause the first processor and the first memory to cooperate to act as:
   a storing unit configured to store user information about users each given any one of an authority of shared office administrator, an authority of tenant administrator, and an authority of a general user belonging to a tenant; and
   a providing unit configured to provide, to a second user given the authority of tenant administrator from a first user having the authority of shared office administrator, a function of designating an allowable number of print sheets with respect to a tenant to which the second user belongs or a third user who belongs to the tenant to which the second user belongs,
   wherein, in a case where the third user, when authenticated, uses the print processing function, the third user is allowed to use the print processing function up to an allowable number of print sheets designated by the second user, who is a tenant administrator of the tenant to which the third user belongs.

2. The image processing apparatus according to claim 1, wherein the second user given the authority of tenant administrator is unable to designate the allowable number of print sheets to a value exceeding an upper limit number of sheets designated by the first user having the authority of shared office administrator with respect to each tenant.

3. The image processing apparatus according to claim 1, wherein, in a case where the third user uses the print processing function, when the allowable number of print sheets designated with respect to a tenant to which the second user belongs or a third user who belongs to the tenant to which the second user belongs is exceeded, a communication indicating incapability of execution of print processing is issued.

4. The image processing apparatus according to claim 1, wherein, in a case where a request for raising an upper limit number of sheets designated with respect to a tenant to which the second user belongs is made from the second user, the request is communicated to the first user, and
   wherein, when the first user has approved raising of the upper limit number of sheets, the upper limit number of sheets designated with respect to the tenant to which the second user making the request belongs is changed.

5. The image processing apparatus according to claim 4, wherein the providing unit provides, to the second user, a screen used to receive a request for raising an upper limit number of sheets designated with respect to a tenant to which the second user belongs.

6. The image processing apparatus according to claim 1, wherein the providing unit provides a number of used sheets for a tenant selected by the first user.

7. The image processing apparatus according to claim 6, wherein the providing unit provides, to the second user, a function of aggregating only numbers of used sheets for a tenant to which the second user belongs.

8. A system comprising:
the image processing apparatus according to claim 1; and
an information processing apparatus,
wherein the first user is not only caused to designate an upper limit number of sheets with respect to each tenant but also caused to designate a usable function included in the image processing function with respect to each tenant.

9. A control method for an image processing apparatus having an image processing function including a print processing function and configured to allow an authenticated user to use the image processing function, the control method comprising:
causing the image processing apparatus to store user information about users each given any one of an authority of shared office administrator, an authority of tenant administrator, and an authority of a general user belonging to a tenant; and
causing the image processing apparatus to provide, to a second user given the authority of tenant administrator from a first user having the authority of shared office administrator, a function of designating an allowable number of print sheets with respect to a tenant to which the second user belongs or a third user who belongs to the tenant to which the second user belongs,
wherein, in a case where the third user, when authenticated, uses the print processing function, the third user is allowed to use the print processing function up to an allowable number of print sheets designated by the second user, who is a tenant administrator of the tenant to which the third user belongs.

10. A non-transitory computer-readable storage medium storing computer-executable instructions that, when executed by a computer, cause the computer to perform a control method for an image processing apparatus having an image processing function including a print processing function and configured to allow an authenticated user to use the image processing function, the control method comprising:
causing the image processing apparatus to store user information about users each given any one of an authority of shared office administrator, an authority of tenant administrator, and an authority of a general user belonging to a tenant; and
causing the image processing apparatus to provide, to a second user given the authority of tenant administrator from a first user having the authority of shared office administrator, a function of designating an allowable number of print sheets with respect to a tenant to which the second user belongs or a third user who belongs to the tenant to which the second user belongs,
wherein, in a case where the third user, when authenticated, uses the print processing function, the third user is allowed to use the print processing function up to an allowable number of print sheets designated by the second user, who is a tenant administrator of the tenant to which the third user belongs.

* * * * *